(12) United States Patent
Palle et al.

(10) Patent No.: US 11,812,405 B2
(45) Date of Patent: Nov. 7, 2023

(54) USER EQUIPMENT OPERATION WITH MULTIPLE SUBSCRIBER IDENTITY MODULES

(71) Applicant: Intel Corporation, Santa Clara, CA (US)

(72) Inventors: Naveen Palle, San Diego, CA (US); Richard Burbidge, Shrivenham (GB); Youn Hyoung Heo, San Jose, CA (US); Sudeep Palat, Cheltenham (GB); Marta Martinez Tarradell, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 135 days.

(21) Appl. No.: 17/116,877

(22) Filed: Dec. 9, 2020

(65) Prior Publication Data
US 2021/0120524 A1 Apr. 22, 2021

Related U.S. Application Data

(60) Provisional application No. 62/946,321, filed on Dec. 10, 2019.

(51) Int. Cl.
*H04W 68/00* (2009.01)
*H04W 76/28* (2018.01)
*H04W 88/06* (2009.01)

(52) U.S. Cl.
CPC ......... *H04W 68/005* (2013.01); *H04W 76/28* (2018.02); *H04W 88/06* (2013.01)

(58) Field of Classification Search
CPC ... H04W 88/06; H04W 76/28; H04W 68/005; H04W 68/02; H04W 52/0216; H04W 68/00; H04W 72/23; H04W 48/18; H04W 76/27; H04W 72/0446; H04L 5/0053
See application file for complete search history.

(56) References Cited

U.S. PATENT DOCUMENTS

| | | | |
|---|---|---|---|
| 2013/0150018 A1* | 6/2013 | Su | H04W 68/12 455/419 |
| 2016/0316421 A1* | 10/2016 | Barakam | H04W 48/16 |
| 2017/0272925 A1* | 9/2017 | Rupanagudi Venkata | H04W 4/90 |
| 2017/0280473 A1* | 9/2017 | Krishnamoorthy | H04W 72/542 |
| 2018/0220329 A1* | 8/2018 | Arumugam | H04L 65/1073 |
| 2021/0105606 A1* | 4/2021 | Bendlin | H04W 60/005 |

(Continued)

FOREIGN PATENT DOCUMENTS

| | | | | |
|---|---|---|---|---|
| WO | WO-2014051387 A1 * | 4/2014 | | H04W 52/0216 |
| WO | WO-2014098409 A1 * | 6/2014 | | H04W 52/265 |
| WO | WO-2019109309 A1 * | 6/2019 | | |

OTHER PUBLICATIONS

3GPP, "3rd Generation Partnership Project; Technical Specification Group Radio Access Network; NR; Radio Resource Control (RRC) protocol specification (Release 15)", 3GPP TS 38.331 V15.7.0, Sep. 2019, 527pages.

*Primary Examiner* — Dung Hong
(74) *Attorney, Agent, or Firm* — Schwabe, Williamson & Wyatt, P.C.

(57) ABSTRACT

Various embodiments herein are directed to multiple subscriber identity module (multi-SIM) operation by a user equipment (UE) in communication with a network. Other embodiments may be described and/or claimed.

17 Claims, 17 Drawing Sheets

600

Retrieving reception timing information associated with a plurality of subscriber identity modules (SIMs) for a user equipment (UE) from memory, wherein the reception timing information comprises an indication of unified time intervals and durations during which idle or inactive operations are to be performed for one or more of the plurality of SIMs
605

↓

Encoding a message that includes the reception timing information for transmission
610

(56) References Cited

U.S. PATENT DOCUMENTS

2021/0410107 A1\* 12/2021 Park ................... H04W 76/27
2022/0394519 A1\* 12/2022 Thangarasa ............ H04L 43/16

\* cited by examiner

... (to 6B)

... (from 6A)

600 

Retrieving reception timing information associated with a plurality of subscriber identity modules (SIMs) for a user equipment (UE) from memory, wherein the reception timing information comprises an indication of unified time intervals and durations during which idle or inactive operations are to be performed for one or more of the plurality of SIMs
605

Encoding a message that includes the reception timing information for transmission
610

Determining reception timing information associated with a plurality of subscriber identity modules (SIMs) for the UE, wherein the reception timing information comprises an indication of unified time intervals and durations during which idle or inactive operations are to be performed for one or more of the plurality of SIMs
625

↓

Encoding a message that includes the reception timing information for transmission to a network for which the UE is registered
630

Determining reception timing information associated with a plurality of subscriber identity modules (SIMs) for the UE, wherein the reception timing information comprises an indication of unified time intervals and durations during which idle or inactive operations are to be performed for one or more of the plurality of SIMs, and wherein the plurality of SIMs include a first SIM associated with a first network and a second SIM associated with a second network
645

Registering with the first network and the second network
650

Encoding a first message that includes reception timing information associated with the second SIM for transmission to the first network
655

Encoding a second message that includes reception timing information associated with the first SIM for transmission to the second network
660

Figure 6E

USER EQUIPMENT OPERATION WITH MULTIPLE SUBSCRIBER IDENTITY MODULES

CROSS REFERENCE TO RELATED APPLICATION

The present application claims priority to U.S. Provisional Patent Application No. 62/946,321, which was filed Dec. 10, 2019; the disclosure of which is hereby incorporated by reference.

FIELD

Embodiments relate generally to the technical field of wireless communications.

BACKGROUND

Various embodiments generally may relate to the field of wireless communications.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

FIGS. 6C, 6D, and 6E illustrate examples of operation flow/algorithmic structures in accordance with some embodiments.

DETAILED DESCRIPTION

Figure 1:
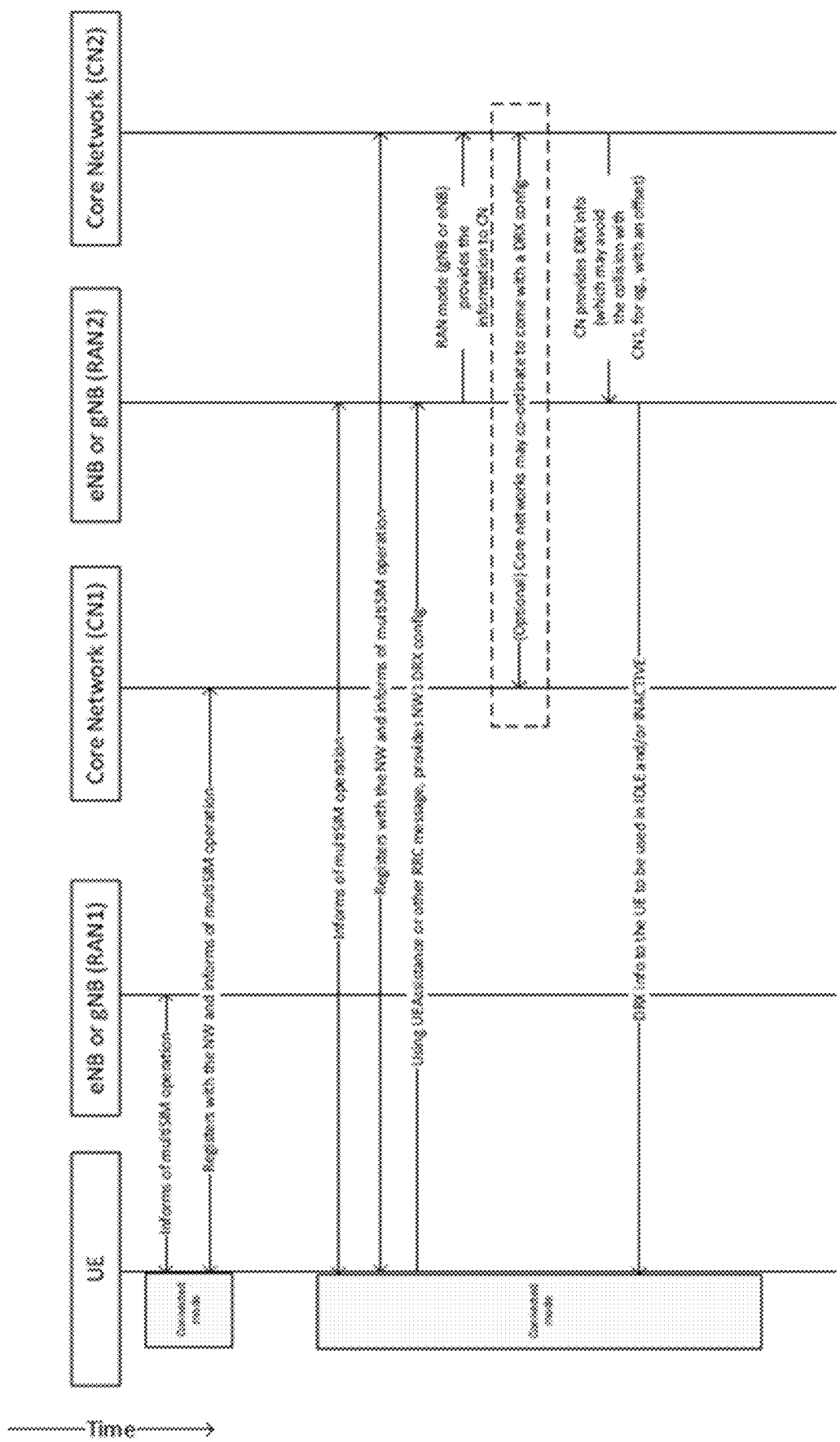
FIG. 1 illustrates an example of a flow diagram illustrating operation of a user equipment (UE) with multiple subscriber identity modules (SIMs) in accordance with various embodiments.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrase "A or B" means (A), (B), or (A and B).

In prior systems, multiple subscriber identity module (multi-SIM) has been performed in a user equipment (UE) as an implementation without the knowledge of the network. The UEs which implement multi-SIM operation with a single RF and single baseband chain may need to create a gap in the Tx/Rx on an ongoing connection. In order to perform reception associated with the other SIM, the network can perceive the loss of Tx/Rx as a radio problem (even when there isn't one), and in some cases the control algorithms in the network can get effected in a negative way. These conditions may result in the wasting of RF resources at the network, incorrect perception at the network as the loss of radio quality between the network and the UE, and in some cases the control algorithms in the network can get effected in a negative way.

Embodiments of the present disclosure address these and other issues. This disclosure provides embodiments directed to multi-SIM operation by a UE in communication with a network, and describes corresponding actions taken both at the network and the UE. In some embodiments, collaboration between the network and the UE on the multi-SIM operation can result in effective usage of the radio resources by the participating networks and also prevent data connection drops, which, in turn, can help provide a more positive user experience.

The following section addresses examples of operations when two SIMS are used by a UE, however the corresponding statements are also applicable if the device were to have more than 2 SIMS. The embodiments below describe operations that may be used standalone or in combination with any other embodiments.

Embodiments Related to Idle/Inactive (SIM1)+Idle/Inactive (SIM2) Behavior

In the case that the network connections associated to both SIMS are idle/inactive, one resulting problem is the case of collision where the UE is to read paging information or perform other idle/inactive receptions at the same time for the network connection associated to each SIM.

In idle/inactive mode, the UE may perform the following for the network connections associated with all the enabled/active SIMS:
1. Perform channel estimation on the known reference signals.
2. Try to find if there is a paging DCI or other DCI carrying PDSCH scheduled for the UE. Decode the PDSCH if needed. In addition, UE may monitor any new wake-up signal/channel that were defined to indicate UEs in idle/inactive when to wake up for specific action (or group of actions), such as, to monitor paging or to receive DL data or to get connected or to update SI.
3. If the DCI does not contain any paging message or if there is no DCI scheduling PDSCH message or the PDSCH message does not contain a message that triggers the UE to connect to the NW (or does not receive any indication to wake-up), continue with the corresponding idle/inactive activities as applicable (e.g. RRM, cell reselection, etc). For example:
    Measure the serving cells for RRM, measure the neighbor cell/frequencies if needed.
4. Perform reception of broadcast data for reselection if needed.
5. If the message triggers the UE to go into connected mode, the UE transitions connected mode to perform Tx/Rx with the network.

In cases where there is collision in the sense that the UE has to perform the idle/inactive actions for the network connections associated with more than one SIM at the same time, embodiments of the present disclosure may be used to help solve this collision, as described below.

Embodiment 5.1a

In some embodiments, when the UE is in connected mode associated with one SIM, it can inform the network of the timings where the UE needs to perform reception on the other networks for which the UE is registered using another SIM (or SIMS) (e.g., based on the paging frame, paging offset and paging monitoring occasion etc., for each of the registered networks). In this manner, the involved networks can be informed about the potential collisions that can occur in time domain. The UE informs the network about the times where it needs to perform reception on the other SIM(S), either explicitly for each SIM or combine the times and report the unified time intervals and durations during which it expects to perform idle/inactive operations on other SIMS. The UE may report this whenever there is a change in the information.

Embodiment 5.1aa

In some embodiments, the UE and the Network can use the UE assistance information RRC message where the UE informs each of the networks about the DRX information. The network then uses the existing RRC message to convey the new/modified DRX information that tries to avoid the potential collisions.

Embodiment 5.1a-1

In some embodiments, another option includes using the existing UE assistance information RRC message, which can be enhanced, and the UE can use this enhanced message to inform each of the networks about its desirable idle/inactive new configuration (e.g. paging DRX configuration) and/or about its problems/collisions when using multi-SIM. The network then may use the existing (or new) RRC message to convey the new/modified idle/inactive configuration (e.g. paging DRX configuration) that tries to avoid the potential collisions (e.g., using an offset in the configurations).

Embodiment 5.1a-2

In some embodiments, A network may coordinate with other NWs the UE is registered with (based on a new set of information that the UEs provides) and provide new/modified idle/inactive configuration for current and potentially even other SIMS.

Embodiment 5.1a-3

In some embodiments, a new RRC message can be created that carries this information from the UE to the network and the network can respond back with a confirmation, where the confirmation can carry the information for the current network that tries to avoid the potential collisions.

Since the paging and the associated DRX cycles are handled mostly at the core network level (even when radio access network also has RAN paging), in some embodiments any information the UE provides in the existing or the new RRC message may need to be provided to the core network as well. The timing diagram in FIG. 1 illustrates an example of such functionality.

Embodiment 5.1a-4

In some embodiments, the information provided by the UE to the RAN node (gNB or eNB) using the existing or the new RRC message from the above embodiments 5.1a-1 to 5.1a-3, is relayed by the RAN node to the core NW where the timing information is provided to the core NW as well, and any configuration (new or modified) by the core NW to the RAN mode is than given to the UE using the existing UE assistance or the new RRC message.

Embodiment 5.2ac

Figure 2:
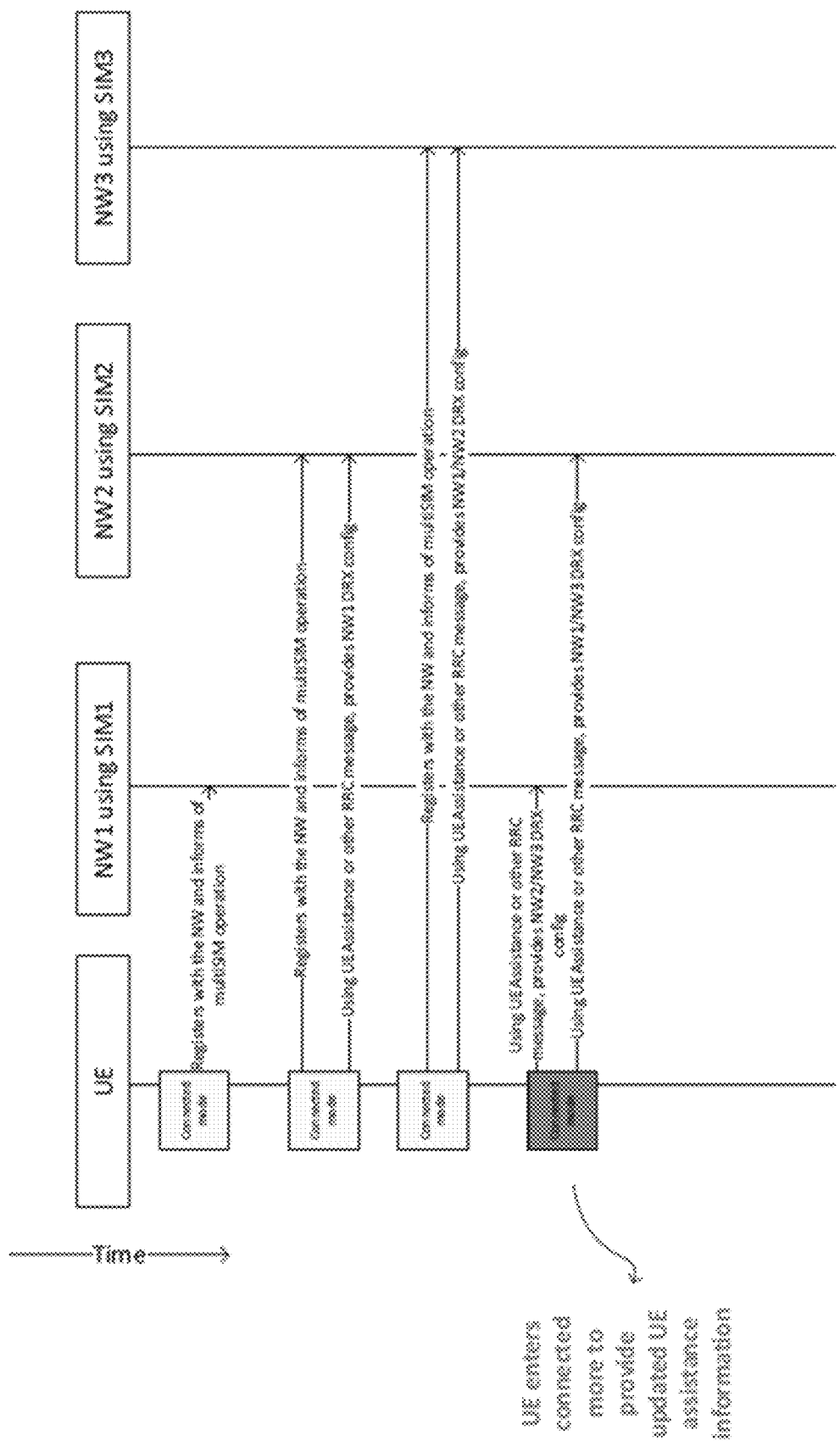
FIG. 2 illustrates another example of a flow diagram illustrating operation of a UE with multiple subscriber identity modules SIMS, in accordance with various embodiments.

In some embodiments, the UE may enter into connected mode from idle/inactive to inform the network about the change (or addition) of new UE assistance information regarding the DRX information from other NW/SIMS. The timing diagram in FIG. 2 illustrates an example of this functionality:
   In the alternative, another way of solving the collision would be for the UE to request the network to page on more than one PF occasion (i.e, the next DRX cycles) if the UE is in multi SIM operation.

Embodiment 5.1b

In some embodiments, the UE informs the network about the multi-SIM operation in the connected mode and explicitly requests the network to transmit the paging information more than once using multiple DRX cycles (consecutive paging frames with the same paging information), so that the UE can try to get the page in next occasion if there is a collision in the current paging cycle. This also solves the case where more than one network has the same paging cycle and offset.

Embodiment 5.1bb

In some embodiments, a new behavior is defined where a UE can be configured by network (RAN and/or CN) to receive the same paging message in multiple occasion in case collisions of the paging when operating in multi-SIM is foreseen. This may be done by defining a new paging window time or by allowing a UE to monitor additional PF/PO (controlled via new configuration sent by the network or defined based on its current PF/PO).

In some cases, even with both the alternatives described above, it may be better if the page can contain all the information needed instead of the UE going into connected mode to get further information that the page intended the UE to receive.

Embodiment 5.1c

In some embodiments, a new paging system may be introduced by which the UE can be provided with a larger PDSCH information that carries the full information (when possible) that the page intended the UE to receive. This is to avoid the UE to go into connected mode to receive the rest of the message that triggered the page.

Embodiments Related to Idle/Inactive (SIM1)+Connected (SIM2) Behavior

Below are listed examples of activities that the UE may perform in conjunction with embodiments of the present disclosure during the ON time of DRX for the SIM which is connected or during paging occasion for the SIM which is in idle/inactive.

1. Perform channel estimation on the known reference signals.
2. Try to find if there is a paging DCI or other DCI carrying PDSCH scheduled for the UE. Decode the PDSCH if needed. In addition, UE may monitor if connected, the "DCI with CRC scrambled by PS-RNTI" (which is defined in Rel-16 to control PDCCH monitoring during on-duration for one or more UEs independently), or if idle/inactive any new wake-up signal/channel that were defined to indicate UEs in idle/inactive when to wake up for specific action (or group of actions), such as, to monitor paging or to receive DL data or to get connected or to update SI.
3. If the DCI does not contain any paging message or if there is no DCI scheduling PDSCH message or the PDSCH message does not contain a message that triggers the UE to connect to the NW (or does not receive any indication to wake-up), continue its connected or and idle/inactive activities as applicable. For example:
   Measure the serving cells for RRM, measure the neighbor cell/frequencies if needed.
4. Perform reception of broadcast data for reselection if needed.
5. If the message triggers the UE to go into connected mode, the UE transitions connected mode to perform Tx/Rx with the network.

Since at least one of the other SIMs is in connected mode, the UE may need to create a gap (interruption of Tx/Rx on the connected mode SIM) to perform the above actions and the duration of the gap could be variable depending on how many of the activities the UE need to perform. The UE and network need to be aligned on when UE has those gaps e.g. based on behaviors captured on specification and/or configuration provided by the network to UE and/or when signal by the network. These gaps (e.g. location, duration) may be different when UE depending on the number of SIMs has in used. Further details are provided in the following subsection.

5.2.1 Methods Based on the Autonomous Gap Creation by the UE

Figure 3:
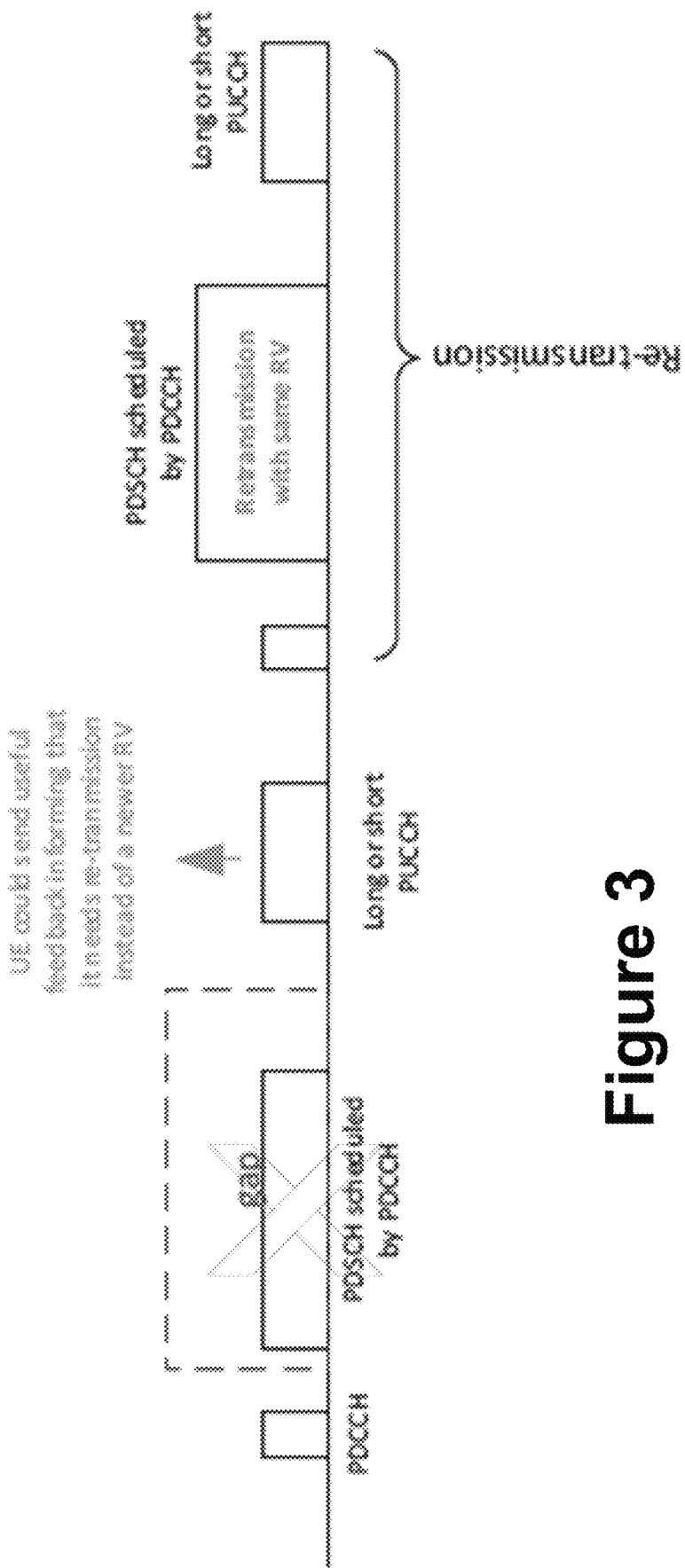
FIG. 3 illustrates an example of transmission timing where a UE requests a network (NW) to transmit an original packet instead of a different redundancy version (RV), in accordance with various embodiments.
Figure 4:
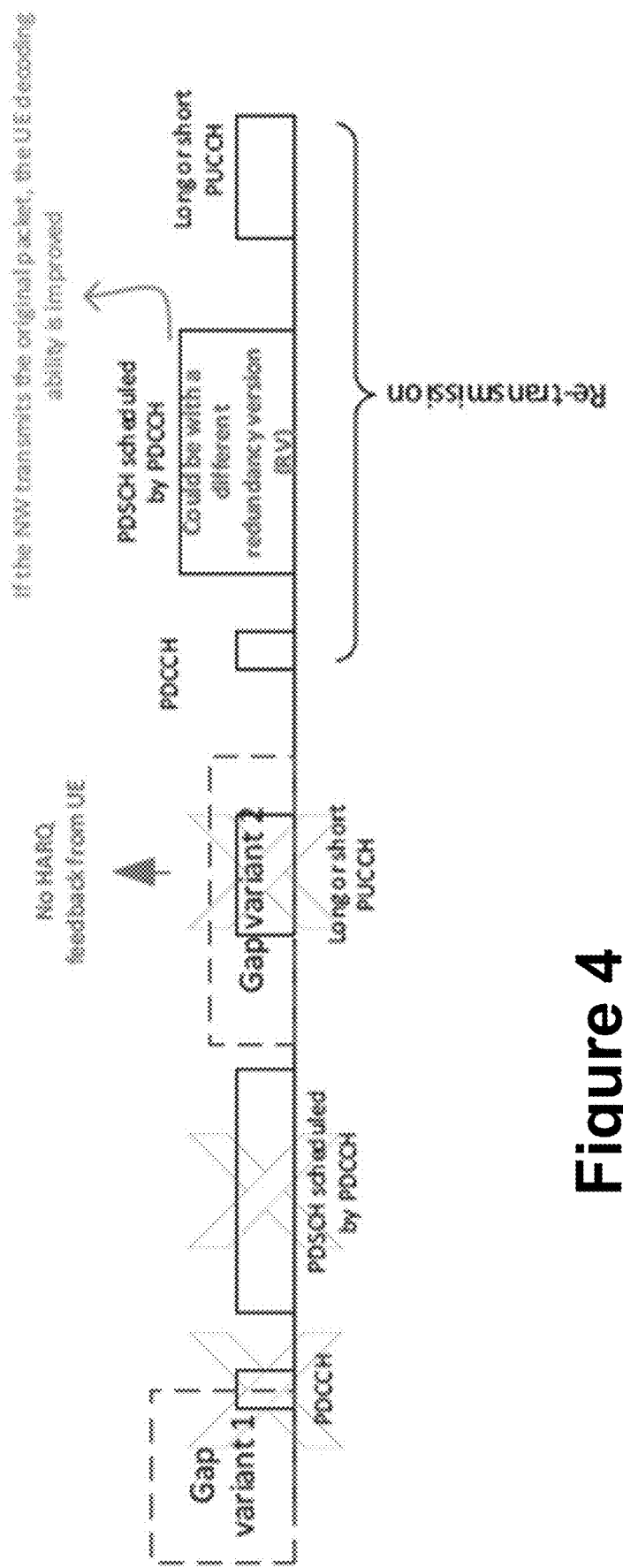
FIG. 4 illustrates an example of transmission timing where a NW can transmit an original packet instead of a different RV, in accordance with various embodiments.

FIG. 3 and FIG. 4 provide examples describing the impact of creating autonomous gaps at the UE while one of the SIMs is in connected mode. In particular, FIG. 3 illustrates a case where the UE requests the NW to transmit the original packet instead of diff RV. FIG. 4 illustrates a case where the NW can transmit the original packet instead of diff RV.

As illustrated in FIG. 3 and FIG. 4, if the UE is able to decode the PDCCH and know that it is expected to provide a HARQ feedback for the DL PDSCH, it can inform the network to retransmit the original packet instead of a re-transmission with a different redundancy version (RV). This can help the UE better, as a different RV usually helps only when the UE has received an earlier PDSCH transmission that it can use along with the different RV.

In addition, in cases where the network does not receive anything in the UL on the HARQ, if the NW re-transmits the same redundancy version (original packet) instead of giving a different RV in the re-transmission, the decoding ability at the UE can be improved.

Embodiment 5.2.1a

In some embodiments, a new HARQ feedback (it can be called RTX—request re-transmission of the last sent redundancy version) from the UE to the NW may be introduced, which requests the NW to not provide a different RV than the one sent in earlier transmission. The UE sends this feedback in case it missed (partially or fully) the earlier transmission due to an autonomous gap.

Embodiment 5.2.1b

Figure 5:
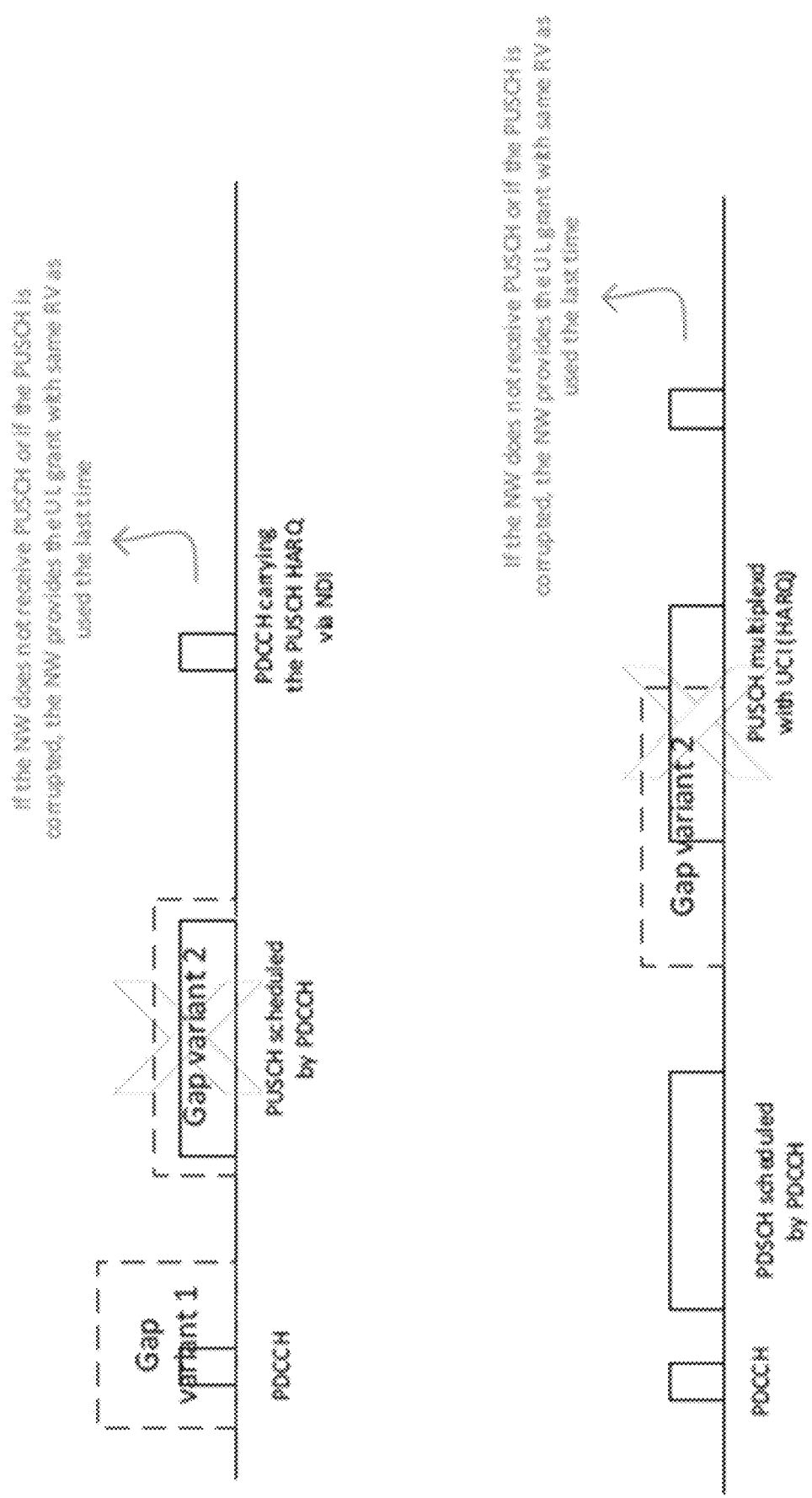
FIG. 5 illustrates an example of transmission timing where a NW provides a UL grant with a previously-used RV, in accordance with various embodiments.

In some embodiments, new logic may be introduced at the network, where if the NW knows that the UE is in multi-SIM operation and if the network does not get any HARQ feedback from the UE for the last transmission, in the re-transmission the network tries to provide the same RV version that was used in the last transmission. FIG. 5 illustrates examples of such functionality.

Similar embodiments may be used for the network behavior in cases where the UL PUSCH received from the UE is corrupted or in cases where the UCI feedback is not received.

Embodiment 5.2.1c

In some embodiments, new logic may be introduced at the network, where if the NW knows that the UE is in multi-SIM operation and if the network does not get any UL PUSCH or UL PUSCH multiplexed with UCI, in the re-transmission grant, the network tries to request the same RV version for the UL that was used in the last UL grant. To re-state this in terms of UE specification, we can also embodiment that, a new configuration can be provided by the network to the UE such that the UE expects the network to request the same RV version for the UL retransmission that was used in the last UL grant.

5.2.2 Methods Based on the Gap Configuration by the Network

The UE can also request the network for a pre-determined gap to perform the activities related to the other SIMs.

At least for some activities (such as 1, 2 and 3 previously listed), the UE can know beforehand the starting time, as well as, the duration for each of the activities on the other SIM. Even with NR using complex paging monitoring offsets due to beam sweeping for monitoring paging, the entire paging monitoring is limited to one paging occasion which the UE can know in advance. Therefore the UE can provide this information to the NW when applicable.

Embodiment 5.2.2a

In some embodiments, when the UE is in connected mode with a SIM, the UE requests a gap in transmission and reception (a gap in time domain) for performing the idle/inactive activities of the other SIMS based on applicable configurations, such as, paging DRX timing (paging frame, paging offset and paging monitoring occasion). The UE may also provide the duration of the gap it needs to perform the activities. This information can be sent using the UE assistance information or another new/existing RRC message (as explained in previous section e.g. embodiments 5.1a*) or other L2/L1 messaging (e.g. via MAC CE or DCI). The required gap may also depend on other factors (e.g. category of UE, operation of the given SIM, etc) which can also be known by network via other sources (e.g. details defined in specification or known via UE's subscription or network assistance).

5.2.2.1 Embodiments where the UE Needs More Time than Provided by the Gap

In some embodiments, the UE may use the gap to try and receive the paging information. But sometime the UE needs to perform more actions (steps 4/5 from section 5.1). This could as part of responding to the page, or to receive system information of a cell on which UE intends to reselect, based on the current serving cell measurements done during the gap. Among others, embodiments of the present disclosure may use two methods to address this:
  The UE uses more time than the gap and informs the network about this; or
  The UE comes back after the gap ends and explicitly informs the network that it needs to performs further actions on the other network and so requests a release of the current connection.

5.2.2.2 Embodiments where the UE Uses More Time than the Gap Provides

If the UE takes (or needs to take) more time than the configured gap, the network needs to be aware of this. One way to handle this would be to have a Rel-15 NR scheduling request (SR) like signaling by the UE and the UE sets this after it has come back after finishing activities 4 or 5. The NW would know by sampling on the SR. The SR method has the advantage that it does not need an UL grant from the NW for the UE to inform that it has finished activities on the other SIM.

Since the amount of the time the UE spends on the other SIM as part of responding to page is variable, the validity of the SR should be guarded by the timer to prevent the current network to wait on the UE by checking on the SR for longer periods. So a guard timer can be added after which the SR configuration is not valid. The expiry of the timer would result in the UE using the legacy procedures to connect back (for eg using RACH). Guard timer also handles the cases where there is mobility involved and the serving cell of the connected mode might not be valid anymore.

Embodiment 5.2.2b

In some embodiments, when the UE is connected mode with a SIM, to handle the cases where the UE needs more than the configured time of the gap in performing activities related to reception associated with the other SIM(s) for eg., for system information reception or for responding to the page, the network needs to be aware of the fact that the UE is still with the other network associated with other SIM and for this reason, we embodiment that the NW configures the UE such that the UE informs the NW when it is back to the current network after a gap expires.
  One method is for the UE to be configured with Rel-15 NR SR-like resource by this network and the UE sets this to inform the network that the UE has finished the activities of other SIMS at the end of a pre-configured measurement gap. If the SR is not set, the network assumes that the UE is performing activities on the other SIM ever after the pre-configured gap has ended.
  Another option is for the network to configure the UE with a SRS resource that the UE sounds as soon as the gap expires so that the network know the UE is back in this network. Embodiment 5.2.2b-1:
In some embodiments, this logic may be needed primarily on the Primary serving cell (PCell) or the Primary Secondary Serving Cell (PSCell), but not necessarily for secondary serving cells (SCells).

Embodiment 5.2.2b-2

In some embodiments, the network can configure the UE to respond that it has come back from the activities associated with other SIM, after the gap expiry for the secondary serving cells (SCells) as an optional feature that the network can decide and we think this can be used, for eg., to address the cases where the PCell/PSCells are not time synchronized with the SCells.

Embodiment 5.2.2c

Additionally, a timer could be set (either defined statically in the specification or configured by the network in a system information or with a dedicated message) and this timer starts when the pre-configured measurement gap ends, and if the UE does not come back to the current SIM before the timer expires (by not setting the SR), the configuration that the UE uses to inorm the network using embodiments 5.2b*, is not valid.
Rel-15 NR already has the RRC INACTIVE state where the UE context is stored by the network (and even within the UE) and we can speed up the resumption on the original SIM if we re-use the INACTIVE logic.

Embodiment 5.2.2d

The network can pre-configure the UE with INACTIVE configuration (the content provided to the UE in the RRC release message for inactive configuration) while the UE is in connected mode itself and if the UE spends time on the other SIM that exceeds the guard timer, the UE and the NW assume that the UE is in INACTIVE state.

Embodiment 5.2.2.d-1a

In INACTIVE, if the UE supports, the UE will also assume dormancy behavior for the configuration and try to measure based on the dormancy configuration (if configured earlier) on the SIM on which the UE was in connected mode earlier, while performing activities on the other SIM which the UE was performing idle/inactive procedures on. In other words, dormancy can be supported for the suspended active SIM configuration (on all the serving cells that were active) while the UE performs activities on the other SIM. Dormancy behavior starts only after the INACTIVE mode starts.

Embodiment 5.2.2d-1b

In the INACTIVE state, the UE keeps the entire configuration the UE had before entering the gap, and the UE and NW assume that the UE resumes with this configuration (including SCG configuration) and based on the network response during the resumption the configuration can be changed.

Embodiment 5.2.2da

The UE keeps the pre-configured INACTIVE configuration which was provided in RRC connected mode, unless NW provides another configuration. The network can update the INACTIVE configuration anytime while the UE is in connected mode, like other RRC configurations.

Embodiment 5.2.2.e

Figure 6A:
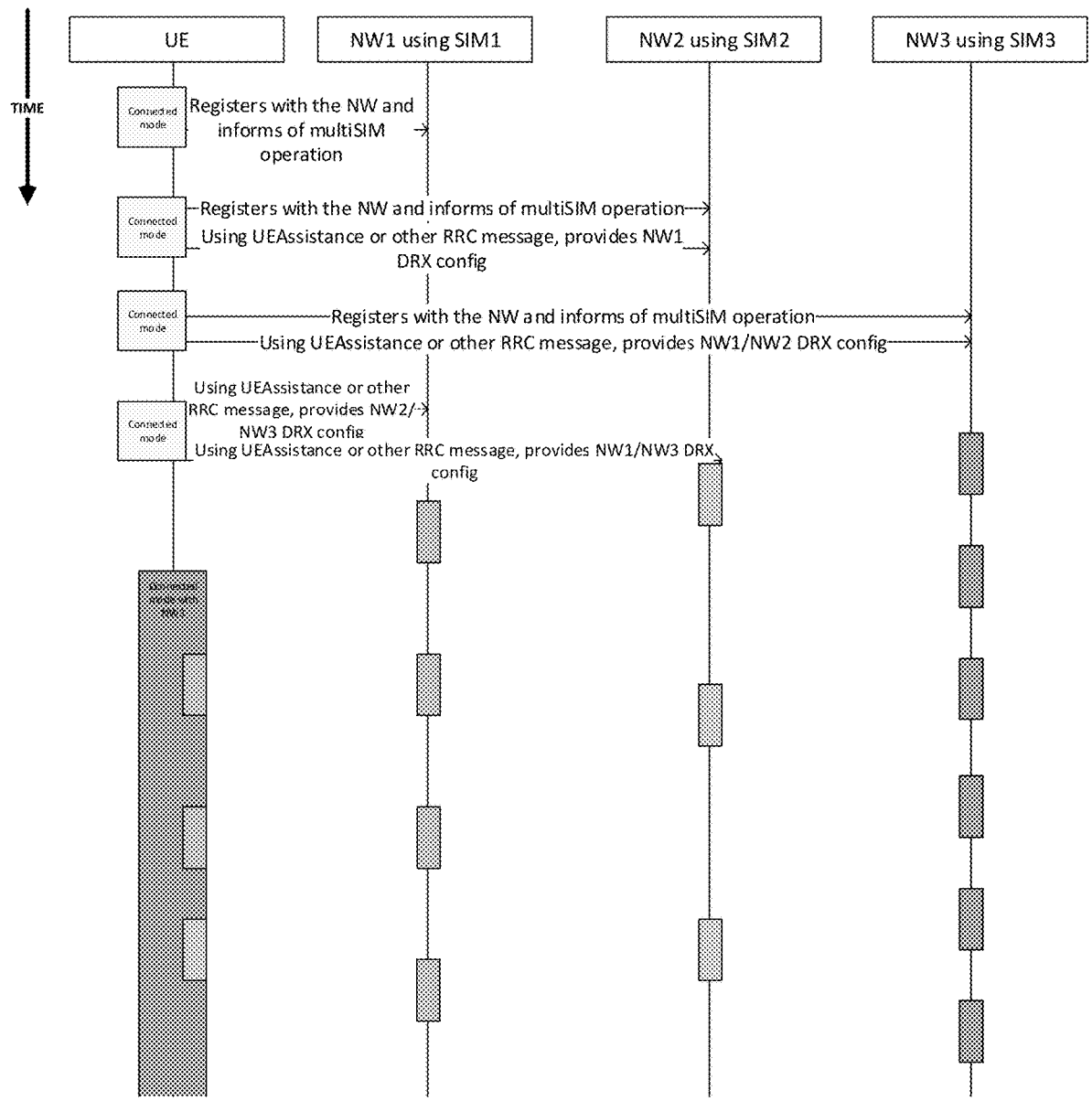
FIGS. 6A and 6B illustrates an example of a timing diagram in accordance with various embodiments.
Figure 6B:
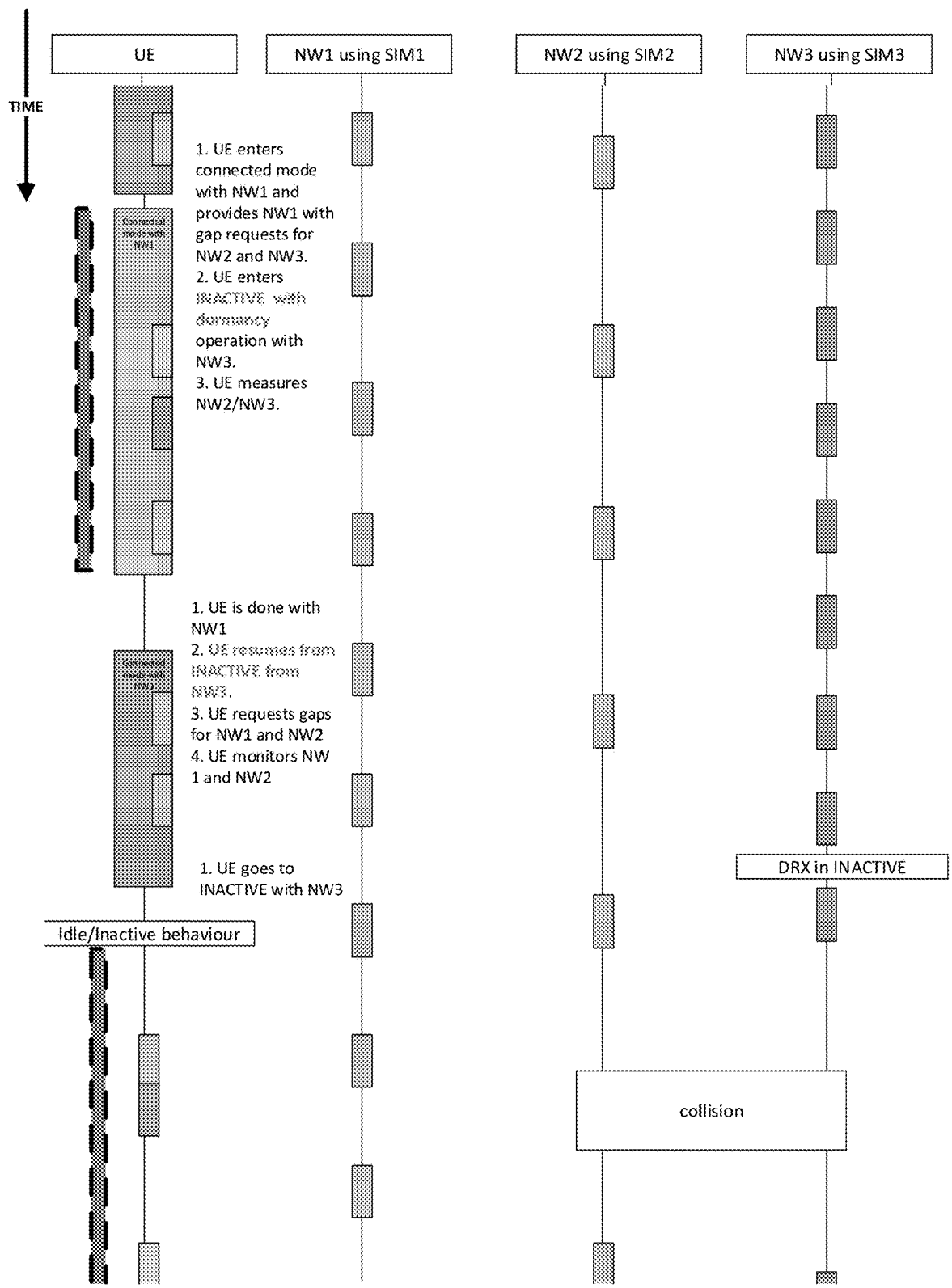

Some embodiments may include another procedure where the timer is not needed. As soon as the pre-configured gap has passed and the UE has not set the SR, the NW and the UE consider that the UE shall enter INACTIVE state using the earlier provided configuration and the embodiments under the sub-section 5.2.2d are valid for this as well. FIG. 6A and FIG. 6B illustrate an example of a timing diagram (FIG. 6B being a continuation of the timing beginning in FIG. 6A) according to various embodiments described above.

5.2.2.3 Embodiments where the UE Requests the Current Network to Release the Current Connection In this alternative, when the UE decides that it needs to perform further activities on the other network, the UE comes back to the current network at the end of the gap, and explicitly requests the current network to move the UE to IDLE or INACTIVE state and once the transition happens, the UE goes back to the other SIM to finish the pending activities.

Embodiment 5.2.2.3a

As another option to embodiments 5.2.2b to 5.2.2e, the UE only uses the time provided in the gap for activities on the other network and if more activities are pending when the gap finishes, the UE comes back to the current network and:
  Using an enhancement to the current UE assistance information, requests the current network to release the current connection (and can optimally provide the time the UE needs to perform the activities on the other network). The UE expresses the desire to go to IDLE or INACTIVE and can provide the reason that it needs to perform activities on the other network.

Alternatively, a new RRC message can be created that the UE uses to request the network to move the UE to IDLE or INACTIVE state.
  Irrespective of which message is used, the UE can provide the timing information of the paging occasions it prefers for this network (which the UE uses to monitor this current network, when the UE moves to IDLE or INACTIVE) and the UE bases this information on the information it has about paging activities on the other networks (using embodiments 5.1a*)
  We also embodiment that it's upto the network to decide if the UE is to be moved to IDLE or INACTIVE. The NW can use the additional information the UE provides, as a means to decide which state the UE is to be moved into.

Embodiments Related to Connected (SIM1)+Connected (SIM2) Behavior

Some UE implementations can support simultaneous Tx and Rx on network connections associated to more than one SIM. For such UEs, ff the UE is in connected mode with networks associated to different SIMS, due to (re)configuration of the RRC in these networks (CA configuration or DC configuration), the UE capability to handle a particular configuration in a network would depend on the configuration of the UE in the other network and this can change dynamically.

To handle the change in capability, which the network has to know, the UE has to inform the network about the changed capability at runtime. The following embodiments address these and other issues.

5.3.1 Dynamic Capability Reduction

Embodiment 5.3a

The UE reports it's full capability to each of the networks it registers initially. If the UE enters into connected mode in an other network as well, depending on the configuration of any of the networks with which the UE is in connected mode, the UE uses RRC message to request for a reduced capability of operation. If the configuration of the other network changes such that the UE capability for the current network also changes, the UE uses the same RRC message to report of the changed capability it can handle.

Embodiment 5.3.1a

One way to implement this is to re-use the UE assistance information RRC message and enhance it with additional parameters that can reflect the changes in UE capability.

Embodiment 5.3.1aa

Using the embodiments disclosed herein, the UE can trigger this message anytime there is a need to inform the change of capability to the relevant network. We also propose that this triggering of UE assistance message would be limited to when the UE is in connected mode.

Embodiment 5.3.1b

As an alternative implementation, a new RRC message can be created to carry the above 'reduction of capability' message.

5.3.2 Semi-Static Capability Allocation at the UE

Embodiment 5.3.2a

A different way of solving the capability change that can result from operation of multiSIM with more than one SIM in connected mode is with UE partitioning it's capabilities across all the SIMS it can support simultaneously and reporting this capability for each of the SIMS. This option avoid the dynamic update/reduction of capabilities.

5.3.3 Semi-Static Capability Allocation at the UE with Delta Updates

Embodiment 5.3.3a

As yet another alternative, the UE can report a set of "delta" configuration to the semi-static capability it reported earlier to the network instead of reporting a reduction from the original capability. The "delta" can reported anytime there is change in configuration on any network the UE is in connected mode with, that resulted in a change in the set of capabilities the UE reports. We can have the delta configuration reported in the UE assistance RRC message or a new RRC message can be used.

Systems and Implementations

Figure 7:
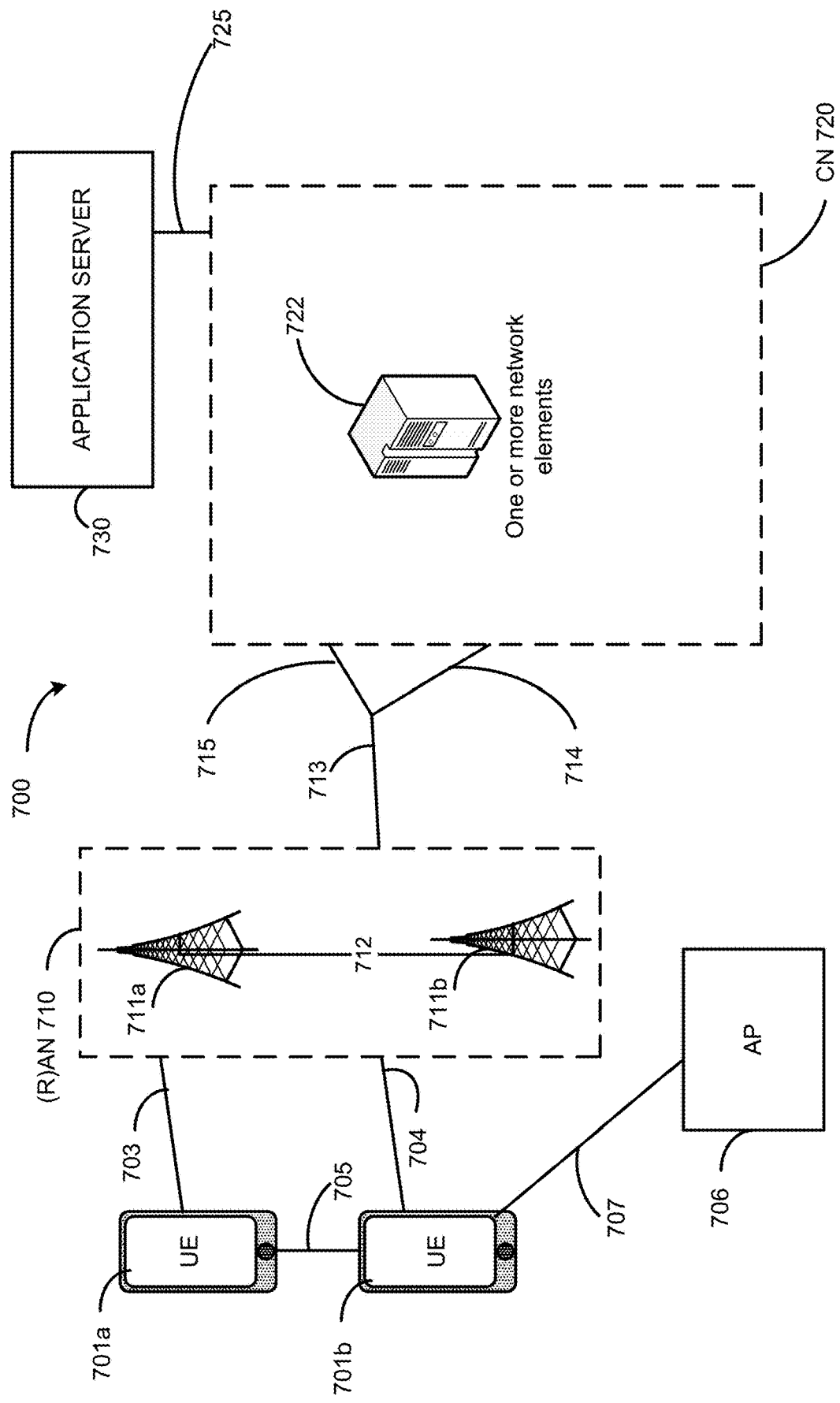
FIG. 7 illustrates an example architecture of a system of a network, in accordance with various embodiments.

FIG. 7 illustrates an example architecture of a system 700 of a network, in accordance with various embodiments. The following description is provided for an example system 700 that operates in conjunction with the LTE system standards and 5G or NR system standards as provided by 3GPP technical specifications. However, the example embodiments are not limited in this regard and the described embodiments may apply to other networks that benefit from the principles described herein, such as future 3GPP systems (e.g., Sixth Generation (6G)) systems, IEEE 802.16 protocols (e.g., WMAN, WiMAX, etc.), or the like.

As shown by FIG. 7, the system 700 includes UE 701a and UE 701b (collectively referred to as "UEs 701" or "UE 701"). In this example, UEs 701 are illustrated as smartphones (e.g., handheld touchscreen mobile computing devices connectable to one or more cellular networks), but may also comprise any mobile or non-mobile computing device, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, MTC devices, M2M, IoT devices, and/or the like.

In some embodiments, any of the UEs 701 may be IoT UEs, which may comprise a network access layer designed for low-power IoT applications utilizing short-lived UE connections. An IoT UE can utilize technologies such as M2M or MTC for exchanging data with an MTC server or device via a PLMN, ProSe or D2D communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 701 may be configured to connect, for example, communicatively couple, with an or RAN 710. In embodiments, the RAN 710 may be an NG RAN or a 5G RAN, an E-UTRAN, or a legacy RAN, such as a UTRAN or GERAN. As used herein, the term "NG RAN" or the like may refer to a RAN 710 that operates in an NR or 5G system 700, and the term "E-UTRAN" or the like may refer to a RAN 710 that operates in an LTE or 4G system 700. The UEs 701 utilize connections (or channels) 703 and 704, respectively, each of which comprises a physical communications interface or layer (discussed in further detail below).

In this example, the connections 703 and 704 are illustrated as an air interface to enable communicative coupling, and can be consistent with cellular communications protocols, such as a GSM protocol, a CDMA network protocol, a PTT protocol, a POC protocol, a UMTS protocol, a 3GPP LTE protocol, a 5G protocol, a NR protocol, and/or any of the other communications protocols discussed herein. In embodiments, the UEs 701 may directly exchange communication data via a ProSe interface 705. The ProSe interface 705 may alternatively be referred to as a SL interface 705 and may comprise one or more logical channels, including but not limited to a PSCCH, a PSSCH, a PSDCH, and a PSBCH.

The UE 701b is shown to be configured to access an AP 706 (also referred to as "WLAN node 706," "WLAN 706," "WLAN Termination 706," "WT 706" or the like) via connection 707. The connection 707 can comprise a local wireless connection, such as a connection consistent with any IEEE 802.11 protocol, wherein the AP 706 would comprise a wireless fidelity (Wi-Fi®) router. In this example, the AP 706 is shown to be connected to the Internet without connecting to the core network of the wireless system (described in further detail below). In various embodiments, the UE 701b, RAN 710, and AP 706 may be configured to utilize LWA operation and/or LWIP operation. The LWA operation may involve the UE 701b in RRC_CONNECTED being configured by a RAN node 711a-b to utilize radio resources of LTE and WLAN. LWIP operation may involve the UE 701b using WLAN radio resources (e.g., connection 707) via IPsec protocol tunneling to authenticate and encrypt packets (e.g., IP packets) sent over the connection 707. IPsec tunneling may include encapsulating the entirety of original IP packets and adding a new packet header, thereby protecting the original header of the IP packets.

The RAN 710 can include one or more AN nodes or RAN nodes 711a and 711b (collectively referred to as "RAN nodes 711" or "RAN node 711") that enable the connections 703 and 704. As used herein, the terms "access node," "access point," or the like may describe equipment that provides the radio baseband functions for data and/or voice connectivity between a network and one or more users. These access nodes can be referred to as BS, gNBs, RAN nodes, eNBs, NodeBs, RSUs, TRxPs or TRPs, and so forth, and can comprise ground stations (e.g., terrestrial access points) or satellite stations providing coverage within a geographic area (e.g., a cell). As used herein, the term "NG RAN node" or the like may refer to a RAN node 711 that operates in an NR or 5G system 700 (for example, a gNB), and the term "E-UTRAN node" or the like may refer to a RAN node 711 that operates in an LTE or 4G system 700 (e.g., an eNB). According to various embodiments, the RAN nodes 711 may be implemented as one or more of a dedicated physical device such as a macrocell base station, and/or a low power (LP) base station for providing femtocells, picocells or other like cells having smaller coverage areas, smaller user capacity, or higher bandwidth compared to macrocells.

In some embodiments, all or parts of the RAN nodes 711 may be implemented as one or more software entities running on server computers as part of a virtual network, which may be referred to as a CRAN and/or a virtual baseband unit pool (vBBUP). In these embodiments, the CRAN or vBBUP may implement a RAN function split, such as a PDCP split wherein RRC and PDCP layers are operated by the CRAN/vBBUP and other L2 protocol entities are operated by individual RAN nodes 711; a MAC/PHY split wherein RRC, PDCP, RLC, and MAC layers are operated by the CRAN/vBBUP and the PHY layer is operated by individual RAN nodes 711; or a "lower PHY" split wherein RRC, PDCP, RLC, MAC layers and upper portions of the PHY layer are operated by the CRAN/vBBUP and lower portions of the PHY layer are operated by individual RAN nodes 711. This virtualized framework allows the freed-up processor cores of the RAN nodes 711 to perform other virtualized applications. In some implementations, an individual RAN node 711 may represent individual gNB-DUs that are connected to a gNB-CU via individual F1 interfaces (not shown by FIG. 7). In these implementations, the gNB-DUs may include one or more remote radio heads or RFEMs (see, e.g., FIG. 9A), and the gNB-CU may be operated by a server that is located in the RAN 710 (not shown) or by a server pool in a similar manner as the CRAN/vBBUP. Additionally or alternatively, one or more of the RAN nodes 711 may be next generation eNBs (ng-eNBs), which are RAN nodes that provide E-UTRA user plane and control plane protocol terminations toward the UEs 701, and are connected to a 5GC (e.g., CN 8220 of FIG. 8B) via an NG interface (discussed infra).

In V2X scenarios one or more of the RAN nodes 711 may be or act as RSUs. The term "Road Side Unit" or "RSU" may refer to any transportation infrastructure entity used for V2X communications. An RSU may be implemented in or by a suitable RAN node or a stationary (or relatively stationary) UE, where an RSU implemented in or by a UE may be referred to as a "UE-type RSU," an RSU implemented in or by an eNB may be referred to as an "eNB-type RSU," an RSU implemented in or by a gNB may be referred to as a "gNB-type RSU," and the like. In one example, an RSU is a computing device coupled with radio frequency circuitry located on a roadside that provides connectivity support to passing vehicle UEs 701 (vUEs 701). The RSU may also include internal data storage circuitry to store intersection map geometry, traffic statistics, media, as well as applications/software to sense and control ongoing vehicular and pedestrian traffic. The RSU may operate on the 5.9 GHz Direct Short Range Communications (DSRC) band to provide very low latency communications required for high speed events, such as crash avoidance, traffic warnings, and the like. Additionally or alternatively, the RSU may operate on the cellular V2X band to provide the aforementioned low latency communications, as well as other cellular communications services. Additionally or alternatively, the RSU may operate as a Wi-Fi hotspot (2.4 GHz band) and/or provide connectivity to one or more cellular networks to provide uplink and downlink communications. The computing device(s) and some or all of the radiofrequency circuitry of the RSU may be packaged in a weatherproof enclosure suitable for outdoor installation, and may include a network interface controller to provide a wired connection (e.g., Ethernet) to a traffic signal controller and/or a backhaul network.

Any of the RAN nodes 711 can terminate the air interface protocol and can be the first point of contact for the UEs 701. In some embodiments, any of the RAN nodes 711 can fulfill various logical functions for the RAN 710 including, but not limited to, radio network controller (RNC) functions such as radio bearer management, uplink and downlink dynamic radio resource management and data packet scheduling, and mobility management.

In embodiments, the UEs 701 can be configured to communicate using OFDM communication signals with each other or with any of the RAN nodes 711 over a multicarrier communication channel in accordance with various communication techniques, such as, but not limited to, an OFDMA communication technique (e.g., for downlink communications) or a SC-FDMA communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 711 to the UEs 701, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

According to various embodiments, the UEs 701 and the RAN nodes 711 communicate data (for example, transmit and receive) data over a licensed medium (also referred to as the "licensed spectrum" and/or the "licensed band") and an unlicensed shared medium (also referred to as the "unlicensed spectrum" and/or the "unlicensed band"). The licensed spectrum may include channels that operate in the frequency range of approximately 400 MHz to approximately 3.8 GHz, whereas the unlicensed spectrum may include the 5 GHz band.

To operate in the unlicensed spectrum, the UEs 701 and the RAN nodes 711 may operate using LAA, eLAA, and/or feLAA mechanisms. In these implementations, the UEs 701 and the RAN nodes 711 may perform one or more known medium-sensing operations and/or carrier-sensing operations in order to determine whether one or more channels in the unlicensed spectrum is unavailable or otherwise occupied prior to transmitting in the unlicensed spectrum. The medium/carrier sensing operations may be performed according to a listen-before-talk (LBT) protocol.

LBT is a mechanism whereby equipment (for example, UEs 701 RAN nodes 711, etc.) senses a medium (for example, a channel or carrier frequency) and transmits when the medium is sensed to be idle (or when a specific channel in the medium is sensed to be unoccupied). The medium sensing operation may include CCA, which utilizes at least ED to determine the presence or absence of other signals on a channel in order to determine if a channel is occupied or clear. This LBT mechanism allows cellular/LAA networks to coexist with incumbent systems in the unlicensed spectrum and with other LAA networks. ED may include sensing RF energy across an intended transmission band for a period of time and comparing the sensed RF energy to a predefined or configured threshold.

Typically, the incumbent systems in the 5 GHz band are WLANs based on IEEE 802.11 technologies. WLAN employs a contention-based channel access mechanism, called CSMA/CA. Here, when a WLAN node (e.g., a mobile station (MS) such as UE 701, AP 706, or the like) intends to transmit, the WLAN node may first perform CCA before transmission. Additionally, a backoff mechanism is used to avoid collisions in situations where more than one WLAN node senses the channel as idle and transmits at the same time. The backoff mechanism may be a counter that is drawn randomly within the CWS, which is increased exponentially upon the occurrence of collision and reset to a minimum value when the transmission succeeds. The LBT mechanism designed for LAA is somewhat similar to the CSMA/CA of WLAN. In some implementations, the LBT procedure for DL or UL transmission bursts including PDSCH or PUSCH transmissions, respectively, may have an LAA contention window that is variable in length between X and Y ECCA slots, where X and Y are minimum and maximum values for the CWSs for LAA. In one example, the minimum CWS for an LAA transmission may be 9 microseconds (μs); however, the size of the CWS and a MCOT (for example, a transmission burst) may be based on governmental regulatory requirements.

The LAA mechanisms are built upon CA technologies of LTE-Advanced systems. In CA, each aggregated carrier is referred to as a CC. A CC may have a bandwidth of 1.4, 3, 5, 10, 15 or 20 MHz and a maximum of five CCs can be aggregated, and therefore, a maximum aggregated bandwidth is 100 MHz. In FDD systems, the number of aggregated carriers can be different for DL and UL, where the number of UL CCs is equal to or lower than the number of DL component carriers. In some cases, individual CCs can have a different bandwidth than other CCs. In TDD systems, the number of CCs as well as the bandwidths of each CC is usually the same for DL and UL.

CA also comprises individual serving cells to provide individual CCs. The coverage of the serving cells may differ, for example, because CCs on different frequency bands will experience different pathloss. A primary service cell or PCell may provide a PCC for both UL and DL, and may handle RRC and NAS related activities. The other serving cells are referred to as SCells, and each SCell may provide an individual SCC for both UL and DL. The SCCs may be added and removed as required, while changing the PCC may require the UE 701 to undergo a handover. In LAA, eLAA, and feLAA, some or all of the SCells may operate in the unlicensed spectrum (referred to as "LAA SCells"), and the LAA SCells are assisted by a PCell operating in the licensed spectrum. When a UE is configured with more than one LAA SCell, the UE may receive UL grants on the configured LAA SCells indicating different PUSCH starting positions within a same subframe.

The PDSCH carries user data and higher-layer signaling to the UEs 701. The PDCCH carries information about the transport format and resource allocations related to the PDSCH channel, among other things. It may also inform the UEs 701 about the transport format, resource allocation, and HARQ information related to the uplink shared channel. Typically, downlink scheduling (assigning control and shared channel resource blocks to the UE 701*b* within a cell) may be performed at any of the RAN nodes 711 based on channel quality information fed back from any of the UEs 701. The downlink resource assignment information may be sent on the PDCCH used for (e.g., assigned to) each of the UEs 701.

The PDCCH uses CCEs to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as REGs. Four Quadrature Phase Shift Keying (QPSK) symbols may be mapped to each REG. The PDCCH can be transmitted using one or more CCEs, depending on the size of the DCI and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an EPDCCH that uses PDSCH resources for control information transmission. The EPDCCH may be transmitted using one or more ECCEs. Similar to above, each ECCE may correspond to nine sets of four physical resource elements known as an EREGs. An ECCE may have other numbers of EREGs in some situations.

The RAN nodes 711 may be configured to communicate with one another via interface 712. In embodiments where the system 700 is an LTE system (e.g., when CN 720 is an EPC 8120 as in FIG. 8A), the interface 712 may be an X2 interface 712. The X2 interface may be defined between two or more RAN nodes 711 (e.g., two or more eNBs and the like) that connect to EPC 720, and/or between two eNBs connecting to EPC 720. In some implementations, the X2 interface may include an X2 user plane interface (X2-U) and an X2 control plane interface (X2-C). The X2-U may provide flow control mechanisms for user data packets transferred over the X2 interface, and may be used to communicate information about the delivery of user data between eNBs. For example, the X2-U may provide specific sequence number information for user data transferred from a MeNB to an SeNB; information about successful in sequence delivery of PDCP PDUs to a UE 701 from an SeNB for user data; information of PDCP PDUs that were not delivered to a UE 701; information about a current minimum desired buffer size at the SeNB for transmitting to the UE user data; and the like. The X2-C may provide intra-LTE access mobility functionality, including context transfers from source to target eNBs, user plane transport control, etc.; load management functionality; as well as inter-cell interference coordination functionality.

In embodiments where the system 700 is a 5G or NR system (e.g., when CN 720 is an 5GC 8220 as in FIG. 8B), the interface 712 may be an Xn interface 712. The Xn interface is defined between two or more RAN nodes 711 (e.g., two or more gNBs and the like) that connect to 5GC 720, between a RAN node 711 (e.g., a gNB) connecting to 5GC 720 and an eNB, and/or between two eNBs connecting to 5GC 720. In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for UE 701 in a connected mode (e.g., CM-CONNECTED) including functionality to manage the UE mobility for connected mode between one or more RAN nodes 711. The mobility support may include context transfer from an old (source) serving RAN node 711 to new (target) serving RAN node 711; and control of user plane tunnels between old (source) serving RAN node 711 to new (target) serving RAN node 711. A protocol stack of the Xn-U may include a transport network layer built on Internet Protocol (IP) transport layer, and a GTP-U layer on top of a UDP and/or IP layer(s) to carry user plane PDUs. The Xn-C protocol stack may include an application layer signaling protocol (referred to as Xn Application Protocol (Xn-AP)) and a transport network layer that is built on SCTP. The SCTP may be on top of an IP layer, and may provide the guaranteed delivery of application layer messages. In the transport IP layer, point-to-point transmission is used to deliver the signaling PDUs. In other implementations, the Xn-U protocol stack and/or the Xn-C protocol stack may be same or similar to the user plane and/or control plane protocol stack(s) shown and described herein.

The RAN 710 is shown to be communicatively coupled to a core network—in this embodiment, core network (CN) 720. The CN 720 may comprise a plurality of network elements 722, which are configured to offer various data and telecommunications services to customers/subscribers (e.g., users of UEs 701) who are connected to the CN 720 via the RAN 710. The components of the CN 720 may be implemented in one physical node or separate physical nodes including components to read and execute instructions from a machine-readable or computer-readable medium (e.g., a non-transitory machine-readable storage medium). In some embodiments, NFV may be utilized to virtualize any or all of the above-described network node functions via executable instructions stored in one or more computer-readable storage mediums (described in further detail below). A logical instantiation of the CN 720 may be referred to as a network slice, and a logical instantiation of a portion of the CN 720 may be referred to as a network sub-slice. NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Generally, the application server 730 may be an element offering applications that use IP bearer resources with the core network (e.g., UMTS PS domain, LTE PS data services, etc.). The application server 730 can also be configured to support one or more communication services (e.g., VoIP sessions, PTT sessions, group communication sessions, social networking services, etc.) for the UEs 701 via the EPC 720.

In embodiments, the CN 720 may be a 5GC (referred to as "5GC 720" or the like), and the RAN 710 may be connected with the CN 720 via an NG interface 713. In embodiments, the NG interface 713 may be split into two parts, an NG user plane (NG-U) interface 714, which carries traffic data between the RAN nodes 711 and a UPF, and the S1 control plane (NG-C) interface 715, which is a signaling interface between the RAN nodes 711 and AMFs. Embodiments where the CN 720 is a 5GC 720 are discussed in more detail with regard to FIG. 8B.

In embodiments, the CN 720 may be a 5G CN (referred to as "5GC 720" or the like), while in other embodiments, the CN 720 may be an EPC). Where CN 720 is an EPC (referred to as "EPC 720" or the like), the RAN 710 may be connected with the CN 720 via an S1 interface 713. In embodiments, the S1 interface 713 may be split into two parts, an S1 user plane (S1-U) interface 714, which carries traffic data between the RAN nodes 711 and the S-GW, and the S1-MME interface 715, which is a signaling interface between the RAN nodes 711 and MMEs.

Figure 8A:
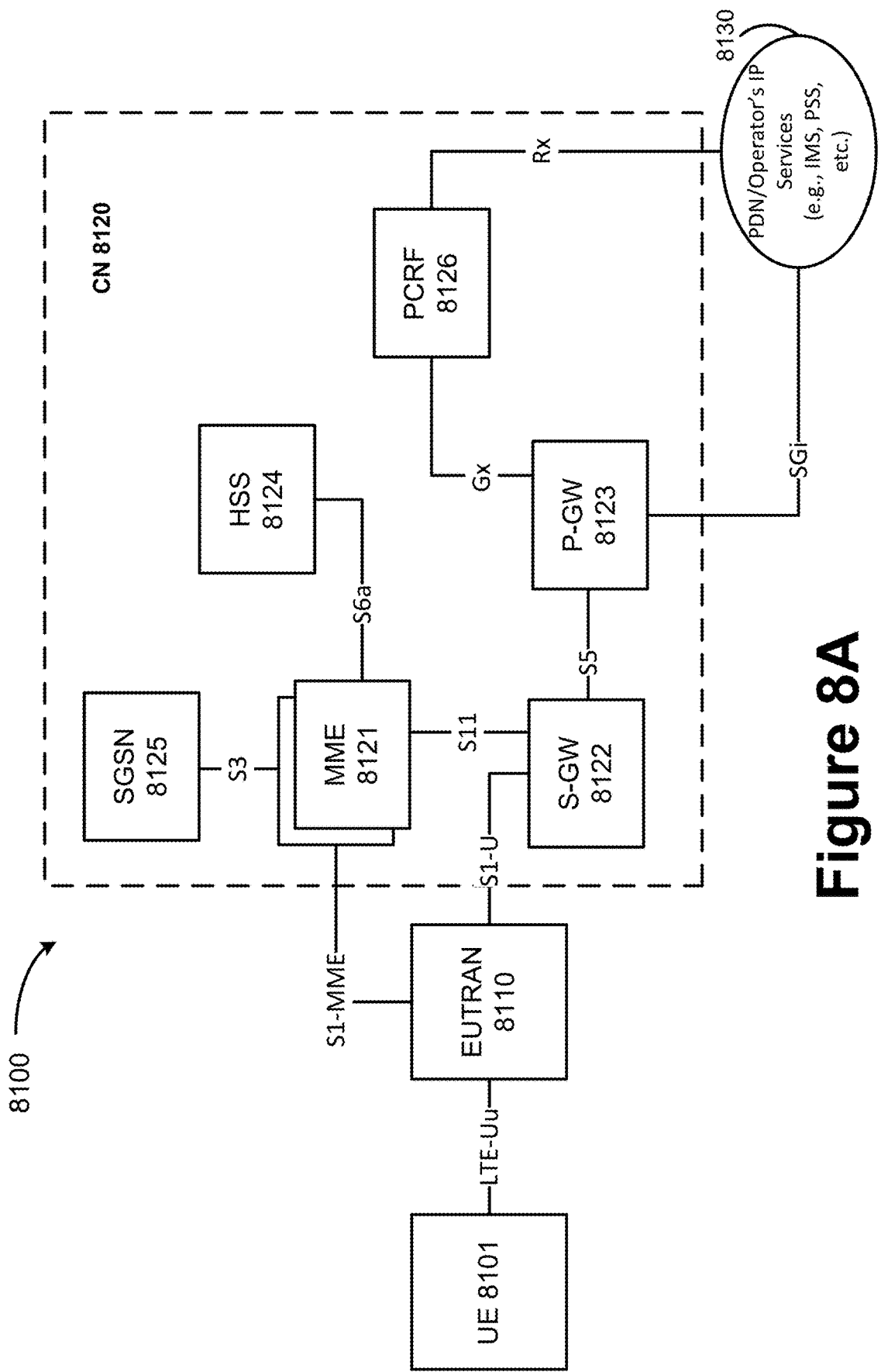
FIG. 8A illustrates an example architecture of a system including a first core network, in accordance with various embodiments.

FIG. 8A illustrates an example architecture of a system 8100 including a first CN 8120, in accordance with various embodiments. In this example, system 8100 may implement the LTE standard wherein the CN 8120 is an EPC 8120 that corresponds with CN 720 of FIG. 7. Additionally, the UE 8101 may be the same or similar as the UEs 701 of FIG. 7, and the E-UTRAN 8110 may be a RAN that is the same or similar to the RAN 710 of FIG. 7, and which may include RAN nodes 711 discussed previously. The CN 8120 may comprise MMEs 8121, an S-GW 8122, a P-GW 8123, a HSS 8124, and a SGSN 8125.

The MMEs 8121 may be similar in function to the control plane of legacy SGSN, and may implement MM functions to keep track of the current location of a UE 8101. The MMEs 8121 may perform various MM procedures to manage mobility aspects in access such as gateway selection and tracking area list management. MM (also referred to as "EPS MM" or "EMM" in E-UTRAN systems) may refer to all applicable procedures, methods, data storage, etc. that are used to maintain knowledge about a present location of the UE 8101, provide user identity confidentiality, and/or perform other like services to users/subscribers. Each UE 8101 and the MME 8121 may include an MM or EMM sublayer, and an MM context may be established in the UE 8101 and the MME 8121 when an attach procedure is successfully completed. The MM context may be a data structure or database object that stores MM-related information of the UE 8101. The MMEs 8121 may be coupled with the HSS 8124 via an S6a reference point, coupled with the SGSN 8125 via an S3 reference point, and coupled with the S-GW 8122 via an S11 reference point.

The SGSN 8125 may be a node that serves the UE 8101 by tracking the location of an individual UE 8101 and performing security functions. In addition, the SGSN 8125 may perform Inter-EPC node signaling for mobility between 2G/3G and E-UTRAN 3GPP access networks; PDN and S-GW selection as specified by the MMEs 8121; handling of UE 8101 time zone functions as specified by the MMEs 8121; and MME selection for handovers to E-UTRAN 3GPP access network. The S3 reference point between the MMEs 8121 and the SGSN 8125 may enable user and bearer information exchange for inter-3GPP access network mobility in idle and/or active states.

The HSS 8124 may comprise a database for network users, including subscription-related information to support the network entities' handling of communication sessions. The EPC 8120 may comprise one or several HSSs 8124, depending on the number of mobile subscribers, on the capacity of the equipment, on the organization of the network, etc. For example, the HSS 8124 can provide support for routing/roaming, authentication, authorization, naming/addressing resolution, location dependencies, etc. An S6a reference point between the HSS 8124 and the MMEs 8121 may enable transfer of subscription and authentication data for authenticating/authorizing user access to the EPC 8120 between HSS 8124 and the MMEs 8121.

The S-GW 8122 may terminate the S1 interface 713 ("S1-U" in FIG. 8A) toward the RAN 8110, and routes data packets between the RAN 8110 and the EPC 8120. In addition, the S-GW 8122 may be a local mobility anchor point for inter-RAN node handovers and also may provide an anchor for inter-3GPP mobility. Other responsibilities may include lawful intercept, charging, and some policy enforcement. The S11 reference point between the S-GW 8122 and the MMEs 8121 may provide a control plane between the MMEs 8121 and the S-GW 8122. The S-GW 8122 may be coupled with the P-GW 8123 via an S5 reference point.

The P-GW 8123 may terminate an SGi interface toward a PDN 8130. The P-GW 8123 may route data packets between the EPC 8120 and external networks such as a network including the application server 730 (alternatively referred to as an "AF") via an IP interface 725 (see e.g., FIG. 7). In embodiments, the P-GW 8123 may be communicatively coupled to an application server (application server 730 of FIG. 7 or PDN 8130 in FIG. 8A) via an IP communications interface 725 (see, e.g., FIG. 7). The S5 reference point between the P-GW 8123 and the S-GW 8122 may provide user plane tunneling and tunnel management between the P-GW 8123 and the S-GW 8122. The S5 reference point may also be used for S-GW 8122 relocation due to UE 8101 mobility and if the S-GW 8122 needs to connect to a non-collocated P-GW 8123 for the required PDN connectivity. The P-GW 8123 may further include a node for policy enforcement and charging data collection (e.g., PCEF (not shown)). Additionally, the SGi reference point between the P-GW 8123 and the packet data network (PDN) 8130 may be an operator external public, a private PDN, or an intra operator packet data network, for example, for provision of IMS services. The P-GW 8123 may be coupled with a PCRF 8126 via a Gx reference point.

PCRF 8126 is the policy and charging control element of the EPC 8120. In a non-roaming scenario, there may be a single PCRF 8126 in the Home Public Land Mobile Network (HPLMN) associated with a UE 8101's Internet Protocol Connectivity Access Network (IP-CAN) session. In a roaming scenario with local breakout of traffic, there may be two PCRFs associated with a UE 8101's IP-CAN session, a Home PCRF (H-PCRF) within an HPLMN and a Visited PCRF (V-PCRF) within a Visited Public Land Mobile Network (VPLMN). The PCRF 8126 may be communicatively coupled to the application server 8130 via the P-GW 8123. The application server 8130 may signal the PCRF 8126 to indicate a new service flow and select the appropriate QoS and charging parameters. The PCRF 8126 may provision this rule into a PCEF (not shown) with the appropriate TFT and QCI, which commences the QoS and charging as specified by the application server 8130. The Gx reference point between the PCRF 8126 and the P-GW 8123 may allow for the transfer of QoS policy and charging rules from the PCRF 8126 to PCEF in the P-GW 8123. An Rx reference point may reside between the PDN 8130 (or "AF 8130") and the PCRF 8126.

Figure 8B:
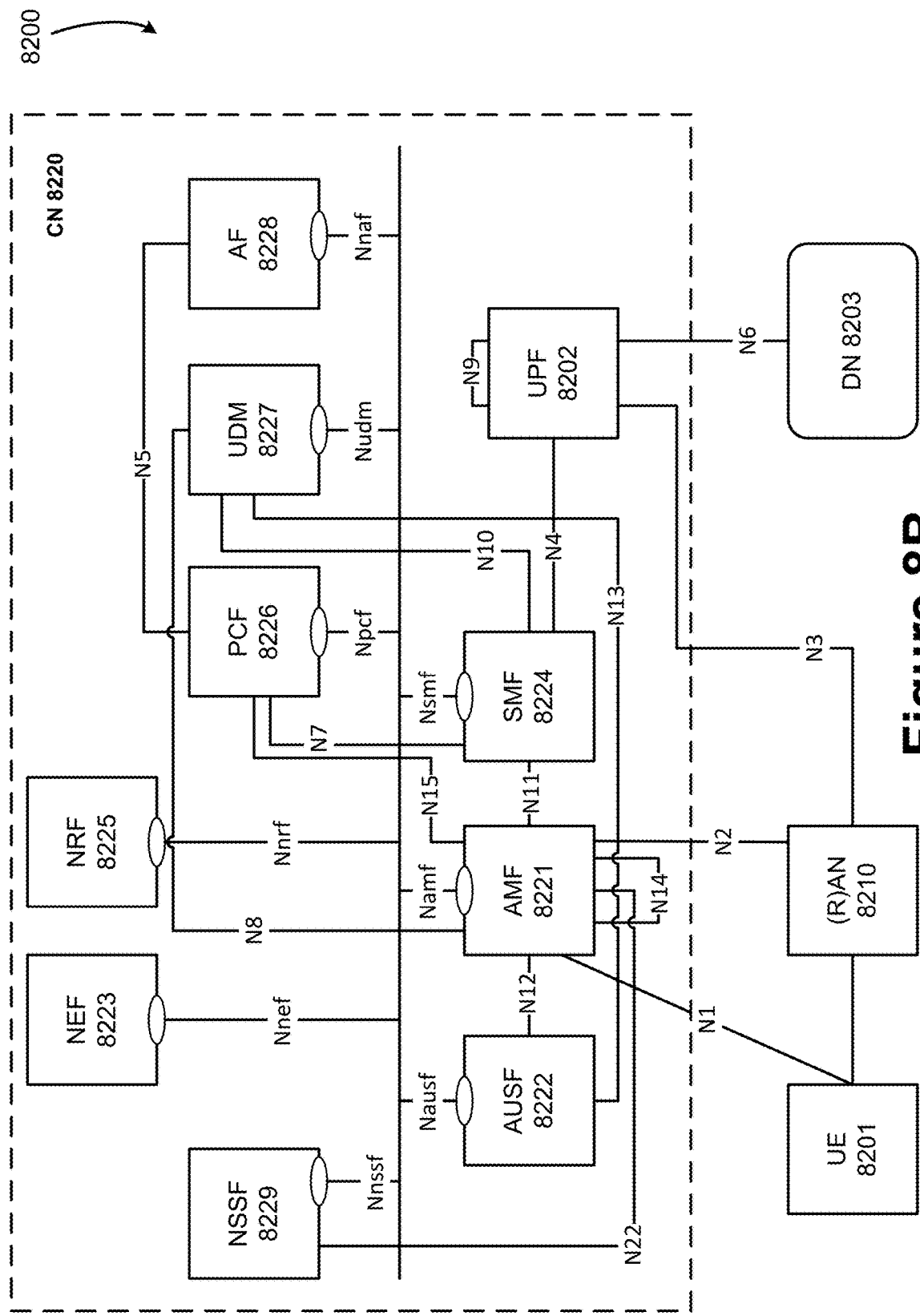
FIG. 8B illustrates an example architecture of a system including a second core network, in accordance with various embodiments.

FIG. 8B illustrates an architecture of a system 8200 including a second CN 8220 in accordance with various embodiments. The system 8200 is shown to include a UE 8201, which may be the same or similar to the UEs 701 and UE 8101 discussed previously; a (R)AN 8210, which may be the same or similar to the RAN 710 and RAN 8110 discussed previously, and which may include RAN nodes 711 discussed previously; and a DN 8203, which may be, for example, operator services, Internet access or 3rd party services; and a 5GC 8220. The 5GC 8220 may include an AUSF 8222; an AMF 8221; a SMF 8224; a NEF 8223; a PCF 8226; a NRF 8225; a UDM 8227; an AF 8228; a UPF 8202; and a NSSF 8229.

The UPF 8202 may act as an anchor point for intra-RAT and inter-RAT mobility, an external PDU session point of interconnect to DN 8203, and a branching point to support multi-homed PDU session. The UPF 8202 may also perform packet routing and forwarding, perform packet inspection, enforce the user plane part of policy rules, lawfully intercept packets (UP collection), perform traffic usage reporting, perform QoS handling for a user plane (e.g., packet filtering, gating, UL/DL rate enforcement), perform Uplink Traffic verification (e.g., SDF to QoS flow mapping), transport level packet marking in the uplink and downlink, and perform downlink packet buffering and downlink data notification triggering. UPF 8202 may include an uplink classifier to support routing traffic flows to a data network. The DN 8203 may represent various network operator services, Internet access, or third party services. DN 8203 may include, or be similar to, application server 730 discussed previously. The UPF 8202 may interact with the SMF 8224 via an N4 reference point between the SMF 8224 and the UPF 8202.

The AUSF 8222 may store data for authentication of UE 8201 and handle authentication-related functionality. The AUSF 8222 may facilitate a common authentication framework for various access types. The AUSF 8222 may communicate with the AMF 8221 via an N12 reference point between the AMF 8221 and the AUSF 8222; and may communicate with the UDM 8227 via an N13 reference point between the UDM 8227 and the AUSF 8222. Additionally, the AUSF 8222 may exhibit an Nausf service-based interface.

The AMF 8221 may be responsible for registration management (e.g., for registering UE 8201, etc.), connection management, reachability management, mobility management, and lawful interception of AMF-related events, and access authentication and authorization. The AMF 8221 may be a termination point for the an N11 reference point between the AMF 8221 and the SMF 8224. The AMF 8221 may provide transport for SM messages between the UE 8201 and the SMF 8224, and act as a transparent proxy for routing SM messages. AMF 8221 may also provide transport for SMS messages between UE 8201 and an SMSF (not shown by FIG. 8B). AMF 8221 may act as SEAF, which may include interaction with the AUSF 8222 and the UE 8201, receipt of an intermediate key that was established as a result of the UE 8201 authentication process. Where USIM based authentication is used, the AMF 8221 may retrieve the security material from the AUSF 8222. AMF 8221 may also include a SCM function, which receives a key from the SEA that it uses to derive access-network specific keys. Furthermore, AMF 8221 may be a termination point of a RAN CP interface, which may include or be an N2 reference point between the (R)AN 8210 and the AMF 8221; and the AMF 8221 may be a termination point of NAS (N1) signalling, and perform NAS ciphering and integrity protection.

AMF 8221 may also support NAS signalling with a UE 8201 over an N3 IWF interface. The N3IWF may be used to provide access to untrusted entities. N3IWF may be a termination point for the N2 interface between the (R)AN 8210 and the AMF 8221 for the control plane, and may be a termination point for the N3 reference point between the (R)AN 8210 and the UPF 8202 for the user plane. As such, the AMF 8221 may handle N2 signalling from the SMF 8224 and the AMF 8221 for PDU sessions and QoS, encapsulate/de-encapsulate packets for IPSec and N3 tunnelling, mark N3 user-plane packets in the uplink, and enforce QoS corresponding to N3 packet marking taking into account QoS requirements associated with such marking received over N2. N3IWF may also relay uplink and downlink control-plane NAS signalling between the UE 8201 and AMF 8221 via an N1 reference point between the UE 8201 and the AMF 8221, and relay uplink and downlink user-plane packets between the UE 8201 and UPF 8202. The N3IWF also provides mechanisms for IPsec tunnel establishment with the UE 8201. The AMF 8221 may exhibit an Namf service-based interface, and may be a termination point for an N14 reference point between two AMFs 8221 and an N17 reference point between the AMF 8221 and a 5G-EIR (not shown by FIG. 8B).

The UE 8201 may need to register with the AMF 8221 in order to receive network services. RM is used to register or deregister the UE 8201 with the network (e.g., AMF 8221), and establish a UE context in the network (e.g., AMF 8221). The UE 8201 may operate in an RM-REGISTERED state or an RM-DEREGISTERED state. In the RM-DEREGISTERED state, the UE 8201 is not registered with the network, and the UE context in AMF 8221 holds no valid location or routing information for the UE 8201 so the UE 8201 is not reachable by the AMF 8221. In the RM-REGISTERED state, the UE 8201 is registered with the network, and the UE context in AMF 8221 may hold a valid location or routing information for the UE 8201 so the UE 8201 is reachable by the AMF 8221. In the RM-REGISTERED state, the UE 8201 may perform mobility Registration Update procedures, perform periodic Registration Update procedures triggered by expiration of the periodic update timer (e.g., to notify the network that the UE 8201 is still active), and perform a Registration Update procedure to update UE capability information or to re-negotiate protocol parameters with the network, among others.

The AMF 8221 may store one or more RM contexts for the UE 8201, where each RM context is associated with a specific access to the network. The RM context may be a data structure, database object, etc. that indicates or stores, inter alia, a registration state per access type and the periodic update timer. The AMF 8221 may also store a 5GC MM context that may be the same or similar to the (E)MM context discussed previously. In various embodiments, the AMF 8221 may store a CE mode B Restriction parameter of the UE 8201 in an associated MM context or RM context. The AMF 8221 may also derive the value, when needed, from the UE's usage setting parameter already stored in the UE context (and/or MM/RM context).

CM may be used to establish and release a signaling connection between the UE 8201 and the AMF 8221 over the N1 interface. The signaling connection is used to enable NAS signaling exchange between the UE 8201 and the CN 8220, and comprises both the signaling connection between the UE and the AN (e.g., RRC connection or UE-N3IWF connection for non-3GPP access) and the N2 connection for the UE 8201 between the AN (e.g., RAN 8210) and the AMF 8221. The UE 8201 may operate in one of two CM states, CM-IDLE mode or CM-CONNECTED mode. When the UE 8201 is operating in the CM-IDLE state/mode, the UE 8201 may have no NAS signaling connection established with the AMF 8221 over the N1 interface, and there may be (R)AN 8210 signaling connection (e.g., N2 and/or N3 connections) for the UE 8201. When the UE 8201 is operating in the CM-CONNECTED state/mode, the UE 8201 may have an established NAS signaling connection with the AMF 8221 over the N1 interface, and there may be a (R)AN 8210 signaling connection (e.g., N2 and/or N3 connections) for the UE 8201. Establishment of an N2 connection between the (R)AN 8210 and the AMF 8221 may cause the UE 8201 to transition from CM-IDLE mode to CM-CONNECTED mode, and the UE 8201 may transition from the CM-CONNECTED mode to the CM-IDLE mode when N2 signaling between the (R)AN 8210 and the AMF 8221 is released.

The SMF 8224 may be responsible for SM (e.g., session establishment, modify and release, including tunnel maintain between UPF and AN node); UE IP address allocation and management (including optional authorization); selection and control of UP function; configuring traffic steering at UPF to route traffic to proper destination; termination of interfaces toward policy control functions; controlling part of policy enforcement and QoS; lawful intercept (for SM events and interface to LI system); termination of SM parts of NAS messages; downlink data notification; initiating AN specific SM information, sent via AMF over N2 to AN; and determining SSC mode of a session. SM may refer to management of a PDU session, and a PDU session or "session" may refer to a PDU connectivity service that provides or enables the exchange of PDUs between a UE 8201 and a data network (DN) 8203 identified by a Data Network Name (DNN). PDU sessions may be established upon UE 8201 request, modified upon UE 8201 and 5GC 8220 request, and released upon UE 8201 and 5GC 8220 request using NAS SM signaling exchanged over the N1 reference point between the UE 8201 and the SMF 8224. Upon request from an application server, the 5GC 8220 may trigger a specific application in the UE 8201. In response to receipt of the trigger message, the UE 8201 may pass the trigger message (or relevant parts/information of the trigger message) to one or more identified applications in the UE 8201. The identified application(s) in the UE 8201 may establish a PDU session to a specific DNN. The SMF 8224 may check whether the UE 8201 requests are compliant with user subscription information associated with the UE 8201. In this regard, the SMF 8224 may retrieve and/or request to receive update notifications on SMF 8224 level subscription data from the UDM 8227.

The SMF 8224 may include the following roaming functionality: handling local enforcement to apply QoS SLAB (VPLMN); charging data collection and charging interface (VPLMN); lawful intercept (in VPLMN for SM events and interface to LI system); and support for interaction with external DN for transport of signalling for PDU session authorization/authentication by external DN. An N16 reference point between two SMFs 8224 may be included in the system 8200, which may be between another SMF 8224 in a visited network and the SMF 8224 in the home network in roaming scenarios. Additionally, the SMF 8224 may exhibit the Nsmf service-based interface.

The NEF 8223 may provide means for securely exposing the services and capabilities provided by 3GPP network functions for third party, internal exposure/re-exposure, Application Functions (e.g., AF 8228), edge computing or fog computing systems, etc. In such embodiments, the NEF 8223 may authenticate, authorize, and/or throttle the AFs. NEF 8223 may also translate information exchanged with the AF 8228 and information exchanged with internal network functions. For example, the NEF 8223 may translate between an AF-Service-Identifier and an internal 5GC information. NEF 8223 may also receive information from other network functions (NFs) based on exposed capabilities of other network functions. This information may be stored at the NEF 8223 as structured data, or at a data storage NF using standardized interfaces. The stored information can then be re-exposed by the NEF 8223 to other NFs and AFs, and/or used for other purposes such as analytics. Additionally, the NEF 8223 may exhibit an Nnef service-based interface.

The NRF 8225 may support service discovery functions, receive NF discovery requests from NF instances, and provide the information of the discovered NF instances to the NF instances. NRF 8225 also maintains information of available NF instances and their supported services. As used herein, the terms "instantiate," "instantiation," and the like may refer to the creation of an instance, and an "instance" may refer to a concrete occurrence of an object, which may occur, for example, during execution of program code. Additionally, the NRF 8225 may exhibit the Nnrf service-based interface.

The PCF 8226 may provide policy rules to control plane function(s) to enforce them, and may also support unified policy framework to govern network behaviour. The PCF 8226 may also implement an FE to access subscription information relevant for policy decisions in a UDR of the UDM 8227. The PCF 8226 may communicate with the AMF 8221 via an N15 reference point between the PCF 8226 and the AMF 8221, which may include a PCF 8226 in a visited network and the AMF 8221 in case of roaming scenarios. The PCF 8226 may communicate with the AF 8228 via an N5 reference point between the PCF 8226 and the AF 8228; and with the SMF 8224 via an N7 reference point between the PCF 8226 and the SMF 8224. The system 8200 and/or CN 8220 may also include an N24 reference point between the PCF 8226 (in the home network) and a PCF 8226 in a visited network. Additionally, the PCF 8226 may exhibit an Npcf service-based interface.

The UDM 8227 may handle subscription-related information to support the network entities' handling of communication sessions, and may store subscription data of UE 8201. For example, subscription data may be communicated between the UDM 8227 and the AMF 8221 via an N8 reference point between the UDM 8227 and the AMF. The UDM 8227 may include two parts, an application FE and a UDR (the FE and UDR are not shown by FIG. 8B). The UDR may store subscription data and policy data for the UDM 8227 and the PCF 8226, and/or structured data for exposure and application data (including PFDs for application detection, application request information for multiple UEs 8201) for the NEF 8223. The Nudr service-based interface may be exhibited by the UDR 221 to allow the UDM 8227, PCF 8226, and NEF 8223 to access a particular set of the stored data, as well as to read, update (e.g., add, modify), delete, and subscribe to notification of relevant data changes in the UDR. The UDM may include a UDM-FE, which is in charge of processing credentials, location management, subscription management and so on. Several different front ends may serve the same user in different transactions. The UDM-FE accesses subscription information stored in the UDR and performs authentication credential processing, user identification handling, access authorization, registration/mobility management, and subscription management. The UDR may interact with the SMF 8224 via an N10 reference point between the UDM 8227 and the SMF 8224. UDM 8227 may also support SMS management, wherein an SMS-FE implements the similar application logic as discussed previously. Additionally, the UDM 8227 may exhibit the Nudm service-based interface.

The AF 8228 may provide application influence on traffic routing, provide access to the NCE, and interact with the policy framework for policy control. The NCE may be a mechanism that allows the 5GC 8220 and AF 8228 to provide information to each other via NEF 8223, which may be used for edge computing implementations. In such implementations, the network operator and third party services may be hosted close to the UE 8201 access point of attachment to achieve an efficient service delivery through the reduced end-to-end latency and load on the transport network. For edge computing implementations, the 5GC may select a UPF 8202 close to the UE 8201 and execute traffic steering from the UPF 8202 to DN 8203 via the N6 interface. This may be based on the UE subscription data, UE location, and information provided by the AF 8228. In this way, the AF 8228 may influence UPF (re)selection and traffic routing. Based on operator deployment, when AF 8228 is considered to be a trusted entity, the network operator may permit AF 8228 to interact directly with relevant NFs. Additionally, the AF 8228 may exhibit an Naf service-based interface.

The NSSF 8229 may select a set of network slice instances serving the UE 8201. The NSSF 8229 may also determine allowed NSSAI and the mapping to the subscribed S-NSSAIs, if needed. The NSSF 8229 may also determine the AMF set to be used to serve the UE 8201, or a list of candidate AMF(s) 8221 based on a suitable configuration and possibly by querying the NRF 8225. The selection of a set of network slice instances for the UE 8201 may be triggered by the AMF 8221 with which the UE 8201 is registered by interacting with the NSSF 8229, which may lead to a change of AMF 8221. The NSSF 8229 may interact with the AMF 8221 via an N22 reference point between AMF 8221 and NSSF 8229; and may communicate with another NSSF 8229 in a visited network via an N31 reference point (not shown by FIG. 8B). Additionally, the NSSF 8229 may exhibit an Nnssf service-based interface.

As discussed previously, the CN 8220 may include an SMSF, which may be responsible for SMS subscription checking and verification, and relaying SM messages to/from the UE 8201 to/from other entities, such as an SMS-GMSC/IWMSC/SMS-router. The SMS may also interact with AMF 8221 and UDM 8227 for a notification procedure that the UE 8201 is available for SMS transfer (e.g., set a UE not reachable flag, and notifying UDM 8227 when UE 8201 is available for SMS).

The CN 120 may also include other elements that are not shown by FIG. 8B, such as a Data Storage system/architecture, a 5G-EIR, a SEPP, and the like. The Data Storage system may include a SDSF, an UDSF, and/or the like. Any NF may store and retrieve unstructured data into/from the UDSF (e.g., UE contexts), via N18 reference point between any NF and the UDSF (not shown by FIG. 8B). Individual NFs may share a UDSF for storing their respective unstructured data or individual NFs may each have their own UDSF located at or near the individual NFs. Additionally, the UDSF may exhibit an Nudsf service-based interface (not shown by FIG. 8B). The 5G-EIR may be an NF that checks the status of PEI for determining whether particular equipment/entities are blacklisted from the network; and the SEPP may be a non-transparent proxy that performs topology hiding, message filtering, and policing on inter-PLMN control plane interfaces.

Additionally, there may be many more reference points and/or service-based interfaces between the NF services in the NFs; however, these interfaces and reference points have been omitted from FIG. 8B for clarity. In one example, the CN 8220 may include an Nx interface, which is an inter-CN interface between the MME (e.g., MME 8121) and the AMF 8221 in order to enable interworking between CN 8220 and CN 8120. Other example interfaces/reference points may include an N5g-EIR service-based interface exhibited by a 5G-EIR, an N27 reference point between the NRF in the visited network and the NRF in the home network; and an N31 reference point between the NSSF in the visited network and the NSSF in the home network.

Figure 9A:
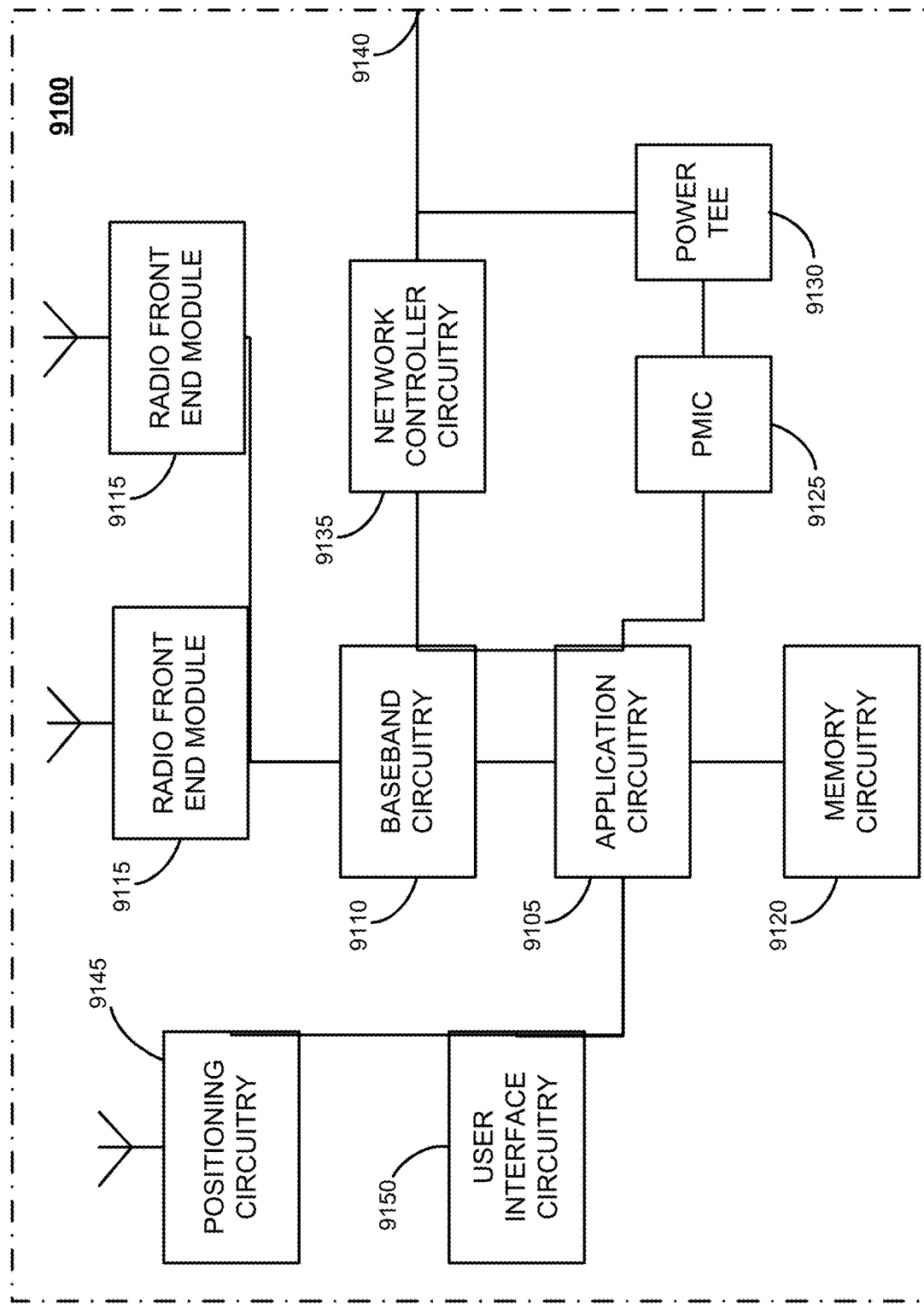
FIG. 9A illustrates an example of infrastructure equipment in accordance with various embodiments.

FIG. 9A illustrates an example of infrastructure equipment 9100 in accordance with various embodiments. The infrastructure equipment 9100 (or "system 9100") may be implemented as a base station, radio head, RAN node such as the RAN nodes 711 and/or AP 706 shown and described previously, application server(s) 730, and/or any other element/device discussed herein. In other examples, the system 9100 could be implemented in or by a UE.

The system 9100 includes application circuitry 9105, baseband circuitry 9110, one or more radio front end modules (RFEMs) 9115, memory circuitry 9120, power management integrated circuitry (PMIC) 9125, power tee circuitry 9130, network controller circuitry 9135, network interface connector 9140, satellite positioning circuitry 9145, and user interface 9150. In some embodiments, the device 9100 may include additional elements such as, for example, memory/storage, display, camera, sensor, or input/output (I/O) interface. In other embodiments, the components described below may be included in more than one device. For example, said circuitries may be separately included in more than one device for CRAN, vBBU, or other like implementations.

Application circuitry 9105 includes circuitry such as, but not limited to one or more processors (or processor cores), cache memory, and one or more of low drop-out voltage regulators (LDOs), interrupt controllers, serial interfaces such as SPI, I2C or universal programmable serial interface module, real time clock (RTC), timer-counters including interval and watchdog timers, general purpose input/output (I/O or IO), memory card controllers such as Secure Digital (SD) MultiMediaCard (MMC) or similar, Universal Serial Bus (USB) interfaces, Mobile Industry Processor Interface (MIPI) interfaces and Joint Test Access Group (JTAG) test access ports. The processors (or cores) of the application circuitry 9105 may be coupled with or may include memory/storage elements and may be configured to execute instructions stored in the memory/storage to enable various applications or operating systems to run on the system 9100. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 9105 may include, for example, one or more processor cores (CPUs), one or more application processors, one or more graphics processing units (GPUs), one or more reduced instruction set computing (RISC) processors, one or more Acorn RISC Machine (ARM) processors, one or more complex instruction set computing (CISC) processors, one or more digital signal processors (DSP), one or more FPGAs, one or more PLDs, one or more ASICs, one or more microprocessors or controllers, or any suitable combination thereof. In some embodiments, the application circuitry 9105 may comprise, or may be, a special-purpose processor/controller to operate according to the various embodiments herein. As examples, the processor(s) of application circuitry 9105 may include one or more Intel Pentium®, Core®, or Xeon® processor(s); Advanced Micro Devices (AMD) Ryzen® processor(s), Accelerated Processing Units (APUs), or Epyc® processors; ARM-based processor(s) licensed from ARM Holdings, Ltd. such as the ARM Cortex-A family of processors and the ThunderX2® provided by Cavium™, Inc.; a MIPS-based design from MIPS Technologies, Inc. such as MIPS Warrior P-class processors; and/or the like. In some embodiments, the system 9100 may not utilize application circuitry 9105, and instead may include a special-purpose processor/controller to process IP data received from an EPC or 5GC, for example.

In some implementations, the application circuitry 9105 may include one or more hardware accelerators, which may be microprocessors, programmable processing devices, or the like. The one or more hardware accelerators may include, for example, computer vision (CV) and/or deep learning (DL) accelerators. As examples, the programmable processing devices may be one or more a field-programmable devices (FPDs) such as field-programmable gate arrays (FPGAs) and the like; programmable logic devices (PLDs) such as complex PLDs (CPLDs), high-capacity PLDs (HCPLDs), and the like; ASICs such as structured ASICs and the like; programmable SoCs (PSoCs); and the like. In such implementations, the circuitry of application circuitry 9105 may comprise logic blocks or logic fabric, and other interconnected resources that may be programmed to perform various functions, such as the procedures, methods, functions, etc. of the various embodiments discussed herein. In such embodiments, the circuitry of application circuitry 9105 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. in look-up-tables (LUTs) and the like.

The baseband circuitry 9110 may be implemented, for example, as a solder-down substrate including one or more integrated circuits, a single packaged integrated circuit soldered to a main circuit board or a multi-chip module containing two or more integrated circuits. The various hardware electronic elements of baseband circuitry 9110 are discussed infra with regard to FIG. 10.

User interface circuitry 9150 may include one or more user interfaces designed to enable user interaction with the system 9100 or peripheral component interfaces designed to enable peripheral component interaction with the system 9100. User interfaces may include, but are not limited to, one or more physical or virtual buttons (e.g., a reset button), one or more indicators (e.g., light emitting diodes (LEDs)), a physical keyboard or keypad, a mouse, a touchpad, a touchscreen, speakers or other audio emitting devices, microphones, a printer, a scanner, a headset, a display screen or display device, etc. Peripheral component interfaces may include, but are not limited to, a nonvolatile memory port, a universal serial bus (USB) port, an audio jack, a power supply interface, etc.

The radio front end modules (RFEMs) 9115 may comprise a millimeter wave (mmWave) RFEM and one or more sub-mmWave radio frequency integrated circuits (RFICs). In some implementations, the one or more sub-mmWave RFICs may be physically separated from the mmWave RFEM. The RFICs may include connections to one or more antennas or antenna arrays (see e.g., antenna array 1011 of FIG. 10 infra), and the RFEM may be connected to multiple antennas. In alternative implementations, both mmWave and sub-mmWave radio functions may be implemented in the same physical RFEM 9115, which incorporates both mmWave antennas and sub-mmWave.

The memory circuitry 9120 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magnetoresistive random access memory (MRAM), etc., and may incorporate the three-dimensional (3D) cross-point (XPOINT) memories from Intel® and Micron®. Memory circuitry 9120 may be implemented as one or more of solder down packaged integrated circuits, socketed memory modules and plug-in memory cards.

The PMIC 9125 may include voltage regulators, surge protectors, power alarm detection circuitry, and one or more backup power sources such as a battery or capacitor. The power alarm detection circuitry may detect one or more of brown out (under-voltage) and surge (over-voltage) conditions. The power tee circuitry 9130 may provide for electrical power drawn from a network cable to provide both power supply and data connectivity to the infrastructure equipment 9100 using a single cable.

The network controller circuitry 9135 may provide connectivity to a network using a standard network interface protocol such as Ethernet, Ethernet over GRE Tunnels, Ethernet over Multiprotocol Label Switching (MPLS), or some other suitable protocol. Network connectivity may be provided to/from the infrastructure equipment 9100 via network interface connector 9140 using a physical connection, which may be electrical (commonly referred to as a "copper interconnect"), optical, or wireless. The network controller circuitry 9135 may include one or more dedicated processors and/or FPGAs to communicate using one or more of the aforementioned protocols. In some implementations, the network controller circuitry 9135 may include multiple controllers to provide connectivity to other networks using the same or different protocols.

The positioning circuitry 9145 includes circuitry to receive and decode signals transmitted/broadcasted by a positioning network of a global navigation satellite system (GNSS). Examples of navigation satellite constellations (or GNSS) include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 9145 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 9145 may include a Micro-Technology for Positioning, Navigation, and Timing (Micro-PNT) IC that uses a master timing clock to perform position tracking/estimation without GNSS assistance. The positioning circuitry 9145 may also be part of, or interact with, the baseband circuitry 9110 and/or RFEMs 9115 to communicate with the nodes and components of the positioning network. The positioning circuitry 9145 may also provide position data and/or time data to the application circuitry 9105, which may use the data to synchronize operations with various infrastructure (e.g., RAN nodes 711, etc.), or the like.

The components shown by FIG. 9A may communicate with one another using interface circuitry, which may include any number of bus and/or interconnect (IX) technologies such as industry standard architecture (ISA), extended ISA (EISA), peripheral component interconnect (PCI), peripheral component interconnect extended (PCIx), PCI express (PCIe), or any number of other technologies. The bus/IX may be a proprietary bus, for example, used in a SoC based system. Other bus/IX systems may be included, such as an I2C interface, an SPI interface, point to point interfaces, and a power bus, among others.

Figure 9B:
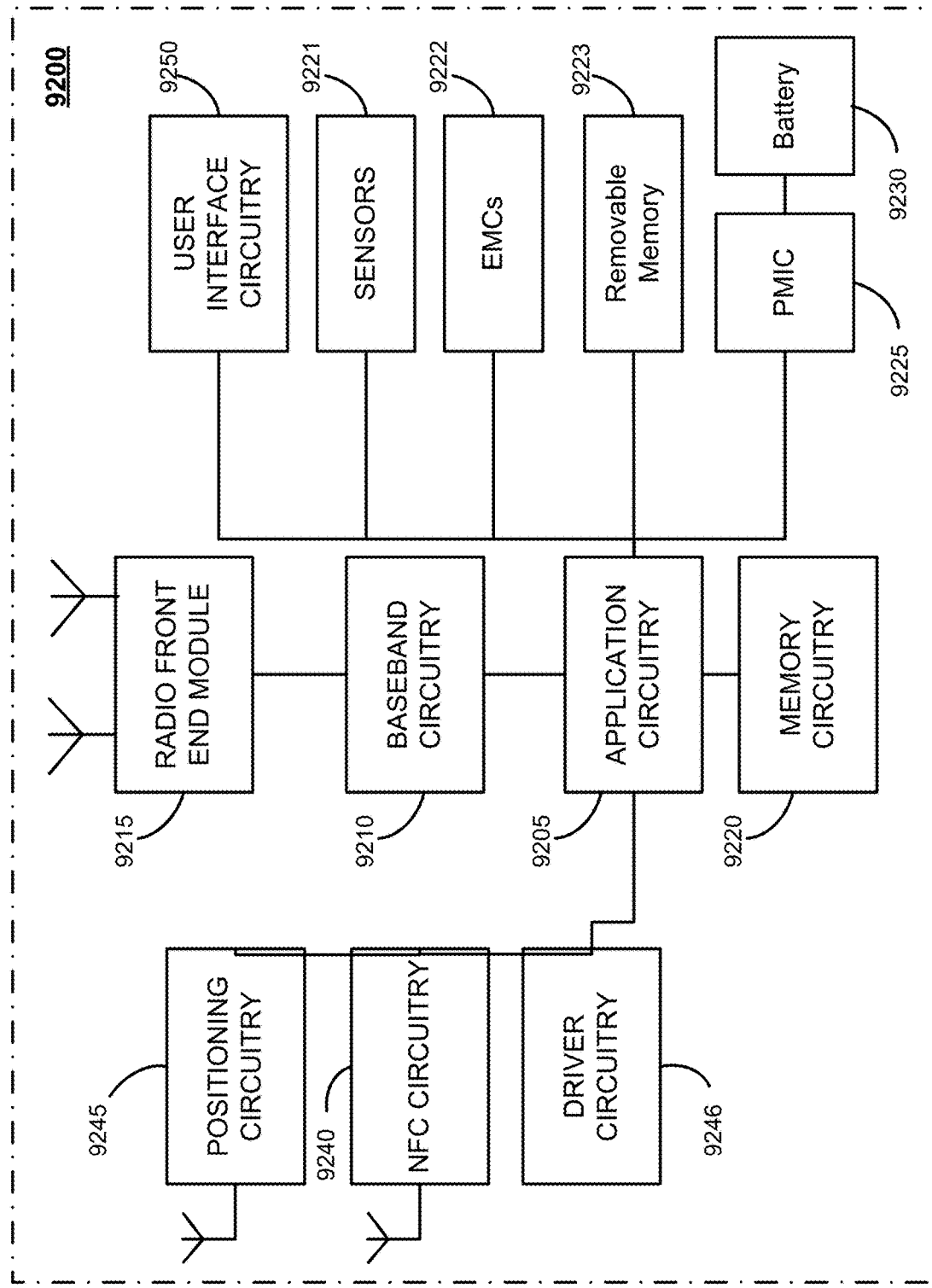
FIG. 9B illustrates an example of a computer platform in accordance with various embodiments.

FIG. 9B illustrates an example of a platform 9200 (or "device 9200") in accordance with various embodiments. In embodiments, the computer platform 9200 may be suitable for use as UEs 701, 8101, 8201, application servers 730, and/or any other element/device discussed herein. The platform 9200 may include any combinations of the components shown in the example. The components of platform 9200 may be implemented as integrated circuits (ICs), portions thereof, discrete electronic devices, or other modules, logic, hardware, software, firmware, or a combination thereof adapted in the computer platform 9200, or as components otherwise incorporated within a chassis of a larger system. The block diagram of FIG. 9B is intended to show a high level view of components of the computer platform 9200. However, some of the components shown may be omitted, additional components may be present, and different arrangement of the components shown may occur in other implementations.

Application circuitry 9205 includes circuitry such as, but not limited to one or more processors (or processor cores), cache memory, and one or more of LDOs, interrupt controllers, serial interfaces such as SPI, I2C or universal programmable serial interface module, RTC, timer-counters including interval and watchdog timers, general purpose I/O, memory card controllers such as SD MMC or similar, USB interfaces, MIPI interfaces, and JTAG test access ports. The processors (or cores) of the application circuitry 9205 may be coupled with or may include memory/storage elements and may be configured to execute instructions stored in the memory/storage to enable various applications or operating systems to run on the system 9200. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 9105 may include, for example, one or more processor cores, one or more application processors, one or more GPUs, one or more RISC processors, one or more ARM processors, one or more CISC processors, one or more DSP, one or more FPGAs, one or more PLDs, one or more ASICs, one or more microprocessors or controllers, a multithreaded processor, an ultra-low voltage processor, an embedded processor, some other known processing element, or any suitable combination thereof. In some embodiments, the application circuitry 9105 may comprise, or may be, a special-purpose processor/controller to operate according to the various embodiments herein.

As examples, the processor(s) of application circuitry 9205 may include an Intel® Architecture Core™ based processor, such as a Quark™, an Atom™, an i3, an i5, an i7, or an MCU-class processor, or another such processor available from Intel® Corporation, Santa Clara, Calif. The processors of the application circuitry 9205 may also be one or more of Advanced Micro Devices (AMD) Ryzen® processor(s) or Accelerated Processing Units (APUs); A5-A9 processor(s) from Apple® Inc., Snapdragon™ processor(s) from Qualcomm® Technologies, Inc., Texas Instruments, Inc.® Open Multimedia Applications Platform (OMAP)™ processor(s); a MIPS-based design from MIPS Technologies, Inc. such as MIPS Warrior M-class, Warrior I-class, and Warrior P-class processors; an ARM-based design licensed from ARM Holdings, Ltd., such as the ARM Cortex-A, Cortex-R, and Cortex-M family of processors; or the like. In some implementations, the application circuitry 9205 may be a part of a system on a chip (SoC) in which the application circuitry 9205 and other components are formed into a single integrated circuit, or a single package, such as the Edison™ or Galileo™ SoC boards from Intel® Corporation.

Additionally or alternatively, application circuitry 9205 may include circuitry such as, but not limited to, one or more a field-programmable devices (FPDs) such as FPGAs and the like; programmable logic devices (PLDs) such as complex PLDs (CPLDs), high-capacity PLDs (HCPLDs), and the like; ASICs such as structured ASICs and the like; programmable SoCs (PSoCs); and the like. In such embodiments, the circuitry of application circuitry 9205 may comprise logic blocks or logic fabric, and other interconnected resources that may be programmed to perform various functions, such as the procedures, methods, functions, etc. of the various embodiments discussed herein. In such embodiments, the circuitry of application circuitry 9205 may include memory cells (e.g., erasable programmable read-only memory (EPROM), electrically erasable programmable read-only memory (EEPROM), flash memory, static memory (e.g., static random access memory (SRAM), antifuses, etc.)) used to store logic blocks, logic fabric, data, etc. in look-up tables (LUTs) and the like.

The baseband circuitry 9210 may be implemented, for example, as a solder-down substrate including one or more integrated circuits, a single packaged integrated circuit soldered to a main circuit board or a multi-chip module containing two or more integrated circuits. The various hardware electronic elements of baseband circuitry 9210 are discussed infra with regard to FIG. 10.

The RFEMs 9215 may comprise a millimeter wave (mmWave) RFEM and one or more sub-mmWave radio frequency integrated circuits (RFICs). In some implementations, the one or more sub-mmWave RFICs may be physically separated from the mmWave RFEM. The RFICs may include connections to one or more antennas or antenna arrays (see e.g., antenna array 1011 of FIG. 10 infra), and the RFEM may be connected to multiple antennas. In alternative implementations, both mmWave and sub-mmWave radio functions may be implemented in the same physical RFEM 9215, which incorporates both mmWave antennas and sub-mmWave.

The memory circuitry 9220 may include any number and type of memory devices used to provide for a given amount of system memory. As examples, the memory circuitry 9220 may include one or more of volatile memory including random access memory (RAM), dynamic RAM (DRAM) and/or synchronous dynamic RAM (SDRAM), and nonvolatile memory (NVM) including high-speed electrically erasable memory (commonly referred to as Flash memory), phase change random access memory (PRAM), magnetoresistive random access memory (MRAM), etc. The memory circuitry 9220 may be developed in accordance with a Joint Electron Devices Engineering Council (JEDEC) low power double data rate (LPDDR)-based design, such as LPDDR2, LPDDR3, LPDDR4, or the like. Memory circuitry 9220 may be implemented as one or more of solder down packaged integrated circuits, single die package (SDP), dual die package (DDP) or quad die package (Q17P), socketed memory modules, dual inline memory modules (DIMMs) including microDIMMs or MiniDIMMs, and/or soldered onto a motherboard via a ball grid array (BGA). In low power implementations, the memory circuitry 9220 may be on-die memory or registers associated with the application circuitry 9205. To provide for persistent storage of information such as data, applications, operating systems and so forth, memory circuitry 9220 may include one or more mass storage devices, which may include, inter alia, a solid state disk drive (SSDD), hard disk drive (HDD), a micro HDD, resistance change memories, phase change memories, holographic memories, or chemical memories, among others. For example, the computer platform 9200 may incorporate the three-dimensional (3D) cross-point (XPOINT) memories from Intel® and Micron®.

Removable memory circuitry 9223 may include devices, circuitry, enclosures/housings, ports or receptacles, etc. used to couple portable data storage devices with the platform 9200. These portable data storage devices may be used for mass storage purposes, and may include, for example, flash memory cards (e.g., Secure Digital (SD) cards, microSD cards, xD picture cards, and the like), and USB flash drives, optical discs, external HDDs, and the like.

The platform 9200 may also include interface circuitry (not shown) that is used to connect external devices with the platform 9200. The external devices connected to the platform 9200 via the interface circuitry include sensor circuitry 9221 and electro-mechanical components (EMCs) 9222, as well as removable memory devices coupled to removable memory circuitry 9223.

The sensor circuitry 9221 include devices, modules, or subsystems whose purpose is to detect events or changes in its environment and send the information (sensor data) about the detected events to some other a device, module, subsystem, etc. Examples of such sensors include, inter alia, inertia measurement units (IMUs) comprising accelerometers, gyroscopes, and/or magnetometers; microelectromechanical systems (MEMS) or nanoelectromechanical systems (NEMS) comprising 3-axis accelerometers, 3-axis gyroscopes, and/or magnetometers; level sensors; flow sensors; temperature sensors (e.g., thermistors); pressure sensors; barometric pressure sensors; gravimeters; altimeters; image capture devices (e.g., cameras or lensless apertures); light detection and ranging (LiDAR) sensors; proximity sensors (e.g., infrared radiation detector and the like), depth sensors, ambient light sensors, ultrasonic transceivers; microphones or other like audio capture devices; etc.

EMCs 9222 include devices, modules, or subsystems whose purpose is to enable platform 9200 to change its state, position, and/or orientation, or move or control a mechanism or (sub)system. Additionally, EMCs 9222 may be configured to generate and send messages/signalling to other components of the platform 9200 to indicate a current state of the EMCs 9222. Examples of the EMCs 9222 include one or more power switches, relays including electromechanical relays (EMRs) and/or solid state relays (SSRs), actuators (e.g., valve actuators, etc.), an audible sound generator, a visual warning device, motors (e.g., DC motors, stepper motors, etc.), wheels, thrusters, propellers, claws, clamps, hooks, and/or other like electro-mechanical components. In embodiments, platform 9200 is configured to operate one or more EMCs 9222 based on one or more captured events and/or instructions or control signals received from a service provider and/or various clients.

In some implementations, the interface circuitry may connect the platform 9200 with positioning circuitry 9245. The positioning circuitry 9245 includes circuitry to receive and decode signals transmitted/broadcasted by a positioning network of a GNSS. Examples of navigation satellite constellations (or GNSS) include United States' GPS, Russia's GLONASS, the European Union's Galileo system, China's BeiDou Navigation Satellite System, a regional navigation system or GNSS augmentation system (e.g., NAVIC), Japan's QZSS, France's DORIS, etc.), or the like. The positioning circuitry 9245 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 9245 may include a Micro-PNT IC that uses a master timing clock to perform position tracking/estimation without GNSS assistance. The positioning circuitry 9245 may also be part of, or interact with, the baseband circuitry 9110 and/or RFEMs 9215 to communicate with the nodes and components of the positioning network. The positioning circuitry 9245 may also provide position data and/or time data to the application circuitry 9205, which may use the data to synchronize operations with various infrastructure (e.g., radio base stations), for turn-by-turn navigation applications, or the like In some implementations, the interface circuitry may connect the platform 9200 with Near-Field Communication (NFC) circuitry 9240. NFC circuitry 9240 is configured to provide contactless, short-range communications based on radio frequency identification (RFID) standards, wherein magnetic field induction is used to enable communication between NFC circuitry 9240 and NFC-enabled devices external to the platform 9200 (e.g., an "NFC touchpoint"). NFC circuitry 9240 comprises an NFC controller coupled with an antenna element and a processor coupled with the NFC controller. The NFC controller may be a chip/IC providing NFC functionalities to the NFC circuitry 9240 by executing NFC controller firmware and an NFC stack. The NFC stack may be executed by the processor to control the NFC controller, and the NFC controller firmware may be executed by the NFC controller to control the antenna element to emit short-range RF signals. The RF signals may power a passive NFC tag (e.g., a microchip embedded in a sticker or wristband) to transmit stored data to the NFC circuitry 9240, or initiate data transfer between the NFC circuitry 9240 and another active NFC device (e.g., a smartphone or an NFC-enabled POS terminal) that is proximate to the platform 9200.

The driver circuitry 9246 may include software and hardware elements that operate to control particular devices that are embedded in the platform 9200, attached to the platform 9200, or otherwise communicatively coupled with the platform 9200. The driver circuitry 9246 may include individual drivers allowing other components of the platform 9200 to interact with or control various input/output (I/O) devices that may be present within, or connected to, the platform 9200. For example, driver circuitry 9246 may include a display driver to control and allow access to a display device, a touchscreen driver to control and allow access to a touchscreen interface of the platform 9200, sensor drivers to obtain sensor readings of sensor circuitry 9221 and control and allow access to sensor circuitry 9221, EMC drivers to obtain actuator positions of the EMCs 9222 and/or control and allow access to the EMCs 9222, a camera driver to control and allow access to an embedded image capture device, audio drivers to control and allow access to one or more audio devices.

The power management integrated circuitry (PMIC) 9225 (also referred to as "power management circuitry 9225") may manage power provided to various components of the platform 9200. In particular, with respect to the baseband circuitry 9210, the PMIC 9225 may control power-source selection, voltage scaling, battery charging, or DC-to-DC conversion. The PMIC 9225 may often be included when the platform 9200 is capable of being powered by a battery 9230, for example, when the device is included in a UE 701, 8101, 8201.

In some embodiments, the PMIC 9225 may control, or otherwise be part of, various power saving mechanisms of the platform 9200. For example, if the platform 9200 is in an RRC_Connected state, where it is still connected to the RAN node as it expects to receive traffic shortly, then it may enter a state known as Discontinuous Reception Mode (DRX) after a period of inactivity. During this state, the platform 9200 may power down for brief intervals of time and thus save power. If there is no data traffic activity for an extended period of time, then the platform 9200 may transition off to an RRC_Idle state, where it disconnects from the network and does not perform operations such as channel quality feedback, handover, etc. The platform 9200 goes into a very low power state and it performs paging where again it periodically wakes up to listen to the network and then powers down again. The platform 9200 may not receive data in this state; in order to receive data, it must transition back to RRC_Connected state. An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

A battery 9230 may power the platform 9200, although in some examples the platform 9200 may be mounted deployed in a fixed location, and may have a power supply coupled to an electrical grid. The battery 9230 may be a lithium ion battery, a metal-air battery, such as a zinc-air battery, an aluminum-air battery, a lithium-air battery, and the like. In some implementations, such as in V2X applications, the battery 9230 may be a typical lead-acid automotive battery.

In some implementations, the battery 9230 may be a "smart battery," which includes or is coupled with a Battery Management System (BMS) or battery monitoring integrated circuitry. The BMS may be included in the platform 9200 to track the state of charge (SoCh) of the battery 9230. The BMS may be used to monitor other parameters of the battery 9230 to provide failure predictions, such as the state of health (SoH) and the state of function (SoF) of the battery 9230. The BMS may communicate the information of the battery 9230 to the application circuitry 9205 or other components of the platform 9200. The BMS may also include an analog-to-digital (ADC) convertor that allows the application circuitry 9205 to directly monitor the voltage of the battery 9230 or the current flow from the battery 9230. The battery parameters may be used to determine actions that the platform 9200 may perform, such as transmission frequency, network operation, sensing frequency, and the like.

A power block, or other power supply coupled to an electrical grid may be coupled with the BMS to charge the battery 9230. In some examples, the power block 930 may be replaced with a wireless power receiver to obtain the power wirelessly, for example, through a loop antenna in the computer platform 9200. In these examples, a wireless battery charging circuit may be included in the BMS. The specific charging circuits chosen may depend on the size of the battery 9230, and thus, the current required. The charging may be performed using the Airfuel standard promulgated by the Airfuel Alliance, the Qi wireless charging standard promulgated by the Wireless Power Consortium, or the Rezence charging standard promulgated by the Alliance for Wireless Power, among others.

User interface circuitry 9250 includes various input/output (I/O) devices present within, or connected to, the platform 9200, and includes one or more user interfaces designed to enable user interaction with the platform 9200 and/or peripheral component interfaces designed to enable peripheral component interaction with the platform 9200. The user interface circuitry 9250 includes input device circuitry and output device circuitry. Input device circuitry includes any physical or virtual means for accepting an input including, inter alia, one or more physical or virtual buttons (e.g., a reset button), a physical keyboard, keypad, mouse, touchpad, touchscreen, microphones, scanner, headset, and/or the like. The output device circuitry includes any physical or virtual means for showing information or otherwise conveying information, such as sensor readings, actuator position(s), or other like information. Output device circuitry may include any number and/or combinations of audio or visual display, including, inter alia, one or more simple visual outputs/indicators (e.g., binary status indicators (e.g., light emitting diodes (LEDs)) and multi-character visual outputs, or more complex outputs such as display devices or touchscreens (e.g., Liquid Chrystal Displays (LCD), LED displays, quantum dot displays, projectors, etc.), with the output of characters, graphics, multimedia objects, and the like being generated or produced from the operation of the platform 9200. The output device circuitry may also include speakers or other audio emitting devices, printer(s), and/or the like. In some embodiments, the sensor circuitry 9221 may be used as the input device circuitry (e.g., an image capture device, motion capture device, or the like) and one or more EMCs may be used as the output device circuitry (e.g., an actuator to provide haptic feedback or the like). In another example, NFC circuitry comprising an NFC controller coupled with an antenna element and a processing device may be included to read electronic tags and/or connect with another NFC-enabled device. Peripheral component interfaces may include, but are not limited to, a non-volatile memory port, a USB port, an audio jack, a power supply interface, etc.

Although not shown, the components of platform 9200 may communicate with one another using a suitable bus or interconnect (IX) technology, which may include any number of technologies, including ISA, EISA, PCI, PCIx, PCIe, a Time-Trigger Protocol (TTP) system, a FlexRay system, or any number of other technologies. The bus/IX may be a proprietary bus/IX, for example, used in a SoC based system. Other bus/IX systems may be included, such as an I²C interface, an SPI interface, point-to-point interfaces, and a power bus, among others.

Figure 10:
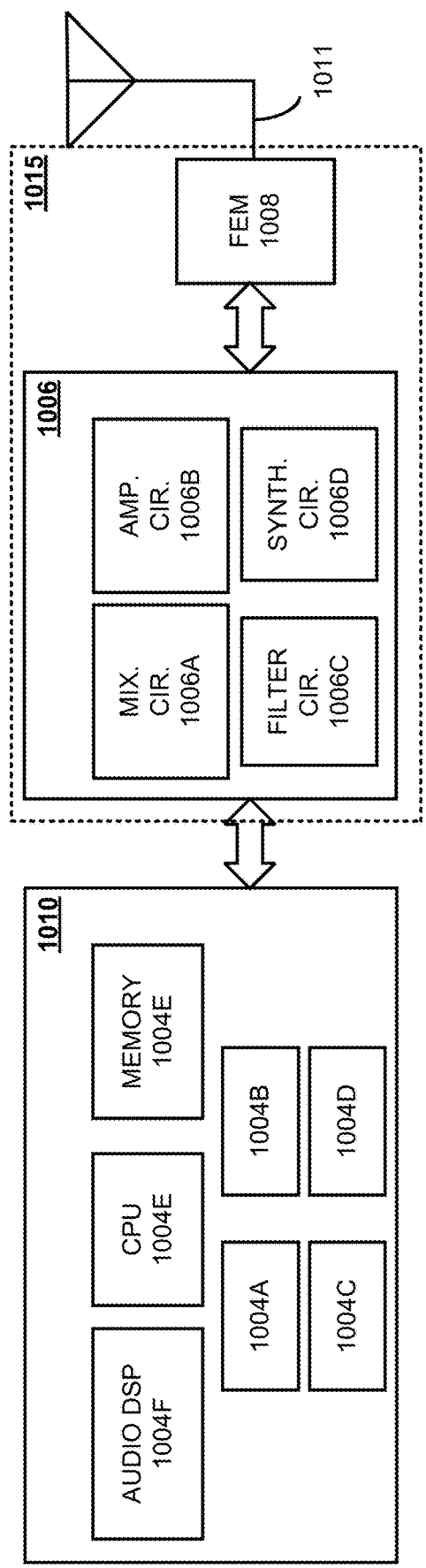
FIG. 10 illustrates example components of baseband circuitry and radio front end modules in accordance with various embodiments.

FIG. 10 illustrates example components of baseband circuitry 1010 and radio front end modules (RFEM) 1015 in accordance with various embodiments. The baseband circuitry 1010 corresponds to the baseband circuitry 9110 and 9210 of FIGS. 9A and 9B, respectively. The RFEM 1015 corresponds to the RFEM 9115 and 9215 of FIGS. 9A and 9B, respectively. As shown, the RFEMs 1015 may include Radio Frequency (RF) circuitry 1006, front-end module (FEM) circuitry 1008, antenna array 1011 coupled together at least as shown.

The baseband circuitry 1010 includes circuitry and/or control logic configured to carry out various radio/network protocol and radio control functions that enable communication with one or more radio networks via the RF circuitry 1006. The radio control functions may include, but are not limited to, signal modulation/demodulation, encoding/decoding, radio frequency shifting, etc. In some embodiments, modulation/demodulation circuitry of the baseband circuitry 1010 may include Fast-Fourier Transform (FFT), precoding, or constellation mapping/demapping functionality. In some embodiments, encoding/decoding circuitry of the baseband circuitry 1010 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments. The baseband circuitry 1010 is configured to process baseband signals received from a receive signal path of the RF circuitry 1006 and to generate baseband signals for a transmit signal path of the RF circuitry 1006. The baseband circuitry 1010 is configured to interface with application circuitry 9105/9205 (see FIGS. 9A and 9B) for generation and processing of the baseband signals and for controlling operations of the RF circuitry 1006. The baseband circuitry 1010 may handle various radio control functions.

The aforementioned circuitry and/or control logic of the baseband circuitry 1010 may include one or more single or multi-core processors. For example, the one or more processors may include a 3G baseband processor 1004A, a 4G/LTE baseband processor 1004B, a 5G/NR baseband processor 1004C, or some other baseband processor(s) 1004D for other existing generations, generations in development or to be developed in the future (e.g., sixth generation (6G), etc.). In other embodiments, some or all of the functionality of baseband processors 1004A-D may be included in modules stored in the memory 1004G and executed via a Central Processing Unit (CPU) 1004E. In other embodiments, some or all of the functionality of baseband processors 1004A-D may be provided as hardware accelerators (e.g., FPGAs, ASICs, etc.) loaded with the appropriate bit streams or logic blocks stored in respective memory cells. In various embodiments, the memory 1004G may store program code of a real-time OS (RTOS), which when executed by the CPU 1004E (or other baseband processor), is to cause the CPU 1004E (or other baseband processor) to manage resources of the baseband circuitry 1010, schedule tasks, etc. Examples of the RTOS may include Operating System Embedded (OSE)™ provided by Enea®, Nucleus RTOS™ provided by Mentor Graphics®, Versatile Real-Time Executive (VRTX) provided by Mentor Graphics®, ThreadX™ provided by Express Logic®, FreeRTOS, REX OS provided by Qualcomm®, OKL4 provided by Open Kernel (OK) Labs®, or any other suitable RTOS, such as those discussed herein. In addition, the baseband circuitry 1010 includes one or more audio digital signal processor(s) (DSP) 1004F. The audio DSP(s) 1004F include elements for compression/decompression and echo cancellation and may include other suitable processing elements in other embodiments.

In some embodiments, each of the processors 1004A-1004E include respective memory interfaces to send/receive data to/from the memory 1004G. The baseband circuitry 1010 may further include one or more interfaces to communicatively couple to other circuitries/devices, such as an interface to send/receive data to/from memory external to the baseband circuitry 1010; an application circuitry interface to send/receive data to/from the application circuitry 9105/9205 of FIGS. 9A-10); an RF circuitry interface to send/receive data to/from RF circuitry 1006 of FIG. 10; a wireless hardware connectivity interface to send/receive data to/from one or more wireless hardware elements (e.g., Near Field Communication (NFC) components, Bluetooth®/Bluetooth® Low Energy components, Wi-Fi® components, and/or the like); and a power management interface to send/receive power or control signals to/from the PMIC 9225.

In alternate embodiments (which may be combined with the above described embodiments), baseband circuitry 1010 comprises one or more digital baseband systems, which are coupled with one another via an interconnect subsystem and to a CPU subsystem, an audio subsystem, and an interface subsystem. The digital baseband subsystems may also be coupled to a digital baseband interface and a mixed-signal baseband subsystem via another interconnect subsystem. Each of the interconnect subsystems may include a bus system, point-to-point connections, network-on-chip (NOC) structures, and/or some other suitable bus or interconnect technology, such as those discussed herein. The audio subsystem may include DSP circuitry, buffer memory, program memory, speech processing accelerator circuitry, data converter circuitry such as analog-to-digital and digital-to-analog converter circuitry, analog circuitry including one or more of amplifiers and filters, and/or other like components. In an aspect of the present disclosure, baseband circuitry 1010 may include protocol processing circuitry with one or more instances of control circuitry (not shown) to provide control functions for the digital baseband circuitry and/or radio frequency circuitry (e.g., the radio front end modules 1015).

Although not shown by FIG. 10, in some embodiments, the baseband circuitry 1010 includes individual processing device(s) to operate one or more wireless communication protocols (e.g., a "multi-protocol baseband processor" or "protocol processing circuitry") and individual processing device(s) to implement PHY layer functions. In these embodiments, the PHY layer functions include the aforementioned radio control functions. In these embodiments, the protocol processing circuitry operates or implements various protocol layers/entities of one or more wireless communication protocols. In a first example, the protocol processing circuitry may operate LTE protocol entities and/or 5G/NR protocol entities when the baseband circuitry 1010 and/or RF circuitry 1006 are part of mmWave communication circuitry or some other suitable cellular communication circuitry. In the first example, the protocol processing circuitry would operate MAC, RLC, PDCP, SDAP, RRC, and NAS functions. In a second example, the protocol processing circuitry may operate one or more IEEE-based protocols when the baseband circuitry 1010 and/or RF circuitry 1006 are part of a Wi-Fi communication system. In the second example, the protocol processing circuitry would operate Wi-Fi MAC and logical link control (LLC) functions. The protocol processing circuitry may include one or more memory structures (e.g., 1004G) to store program code and data for operating the protocol functions, as well as one or more processing cores to execute the program code and perform various operations using the data. The baseband circuitry 1010 may also support radio communications for more than one wireless protocol.

The various hardware elements of the baseband circuitry 1010 discussed herein may be implemented, for example, as a solder-down substrate including one or more integrated circuits (ICs), a single packaged IC soldered to a main circuit board or a multi-chip module containing two or more ICs. In one example, the components of the baseband circuitry 1010 may be suitably combined in a single chip or chipset, or disposed on a same circuit board. In another example, some or all of the constituent components of the baseband circuitry 1010 and RF circuitry 1006 may be implemented together such as, for example, a system on a chip (SoC) or System-in-Package (SiP). In another example, some or all of the constituent components of the baseband circuitry 1010 may be implemented as a separate SoC that is communicatively coupled with and RF circuitry 1006 (or multiple instances of RF circuitry 1006). In yet another example, some or all of the constituent components of the baseband circuitry 1010 and the application circuitry 9105/9205 may be implemented together as individual SoCs mounted to a same circuit board (e.g., a "multi-chip package").

In some embodiments, the baseband circuitry 1010 may provide for communication compatible with one or more radio technologies. For example, in some embodiments, the baseband circuitry 1010 may support communication with an E-UTRAN or other WMAN, a WLAN, a WPAN. Embodiments in which the baseband circuitry 1010 is configured to support radio communications of more than one wireless protocol may be referred to as multi-mode baseband circuitry.

RF circuitry 1006 may enable communication with wireless networks using modulated electromagnetic radiation through a non-solid medium. In various embodiments, the RF circuitry 1006 may include switches, filters, amplifiers, etc. to facilitate the communication with the wireless network. RF circuitry 1006 may include a receive signal path, which may include circuitry to down-convert RF signals received from the FEM circuitry 1008 and provide baseband signals to the baseband circuitry 1010. RF circuitry 1006 may also include a transmit signal path, which may include circuitry to up-convert baseband signals provided by the baseband circuitry 1010 and provide RF output signals to the FEM circuitry 1008 for transmission.

In some embodiments, the receive signal path of the RF circuitry 1006 may include mixer circuitry 1006*a*, amplifier circuitry 1006*b* and filter circuitry 1006*c*. In some embodiments, the transmit signal path of the RF circuitry 1006 may include filter circuitry 1006*c* and mixer circuitry 1006*a*. RF circuitry 1006 may also include synthesizer circuitry 1006*d* for synthesizing a frequency for use by the mixer circuitry 1006*a* of the receive signal path and the transmit signal path. In some embodiments, the mixer circuitry 1006*a* of the receive signal path may be configured to down-convert RF signals received from the FEM circuitry 1008 based on the synthesized frequency provided by synthesizer circuitry 1006*d*. The amplifier circuitry 1006*b* may be configured to amplify the down-converted signals and the filter circuitry 1006*c* may be a low-pass filter (LPF) or band-pass filter (BPF) configured to remove unwanted signals from the down-converted signals to generate output baseband signals. Output baseband signals may be provided to the baseband circuitry 1010 for further processing. In some embodiments, the output baseband signals may be zero-frequency baseband signals, although this is not a requirement. In some embodiments, mixer circuitry 1006*a* of the receive signal path may comprise passive mixers, although the scope of the embodiments is not limited in this respect.

In some embodiments, the mixer circuitry 1006a of the transmit signal path may be configured to up-convert input baseband signals based on the synthesized frequency provided by the synthesizer circuitry 1006d to generate RF output signals for the FEM circuitry 1008. The baseband signals may be provided by the baseband circuitry 1010 and may be filtered by filter circuitry 1006c.

In some embodiments, the mixer circuitry 1006a of the receive signal path and the mixer circuitry 1006a of the transmit signal path may include two or more mixers and may be arranged for quadrature downconversion and upconversion, respectively. In some embodiments, the mixer circuitry 1006a of the receive signal path and the mixer circuitry 1006a of the transmit signal path may include two or more mixers and may be arranged for image rejection (e.g., Hartley image rejection). In some embodiments, the mixer circuitry 1006a of the receive signal path and the mixer circuitry 1006a of the transmit signal path may be arranged for direct downconversion and direct upconversion, respectively. In some embodiments, the mixer circuitry 1006a of the receive signal path and the mixer circuitry 1006a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 1006 may include analog-to-digital converter (ADC) and digital-to-analog converter (DAC) circuitry and the baseband circuitry 1010 may include a digital baseband interface to communicate with the RF circuitry 1006.

In some dual-mode embodiments, a separate radio IC circuitry may be provided for processing signals for each spectrum, although the scope of the embodiments is not limited in this respect.

In some embodiments, the synthesizer circuitry 1006d may be a fractional-N synthesizer or a fractional N/N+1 synthesizer, although the scope of the embodiments is not limited in this respect as other types of frequency synthesizers may be suitable. For example, synthesizer circuitry 1006d may be a delta-sigma synthesizer, a frequency multiplier, or a synthesizer comprising a phase-locked loop with a frequency divider.

The synthesizer circuitry 1006d may be configured to synthesize an output frequency for use by the mixer circuitry 1006a of the RF circuitry 1006 based on a frequency input and a divider control input. In some embodiments, the synthesizer circuitry 1006d may be a fractional N/N+1 synthesizer.

In some embodiments, frequency input may be provided by a voltage controlled oscillator (VCO), although that is not a requirement. Divider control input may be provided by either the baseband circuitry 1010 or the application circuitry 9105/9205 depending on the desired output frequency. In some embodiments, a divider control input (e.g., N) may be determined from a look-up table based on a channel indicated by the application circuitry 9105/9205.

Synthesizer circuitry 1006d of the RF circuitry 1006 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 1006d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 1006 may include an IQ/polar converter.

FEM circuitry 1008 may include a receive signal path, which may include circuitry configured to operate on RF signals received from antenna array 1011, amplify the received signals and provide the amplified versions of the received signals to the RF circuitry 1006 for further processing. FEM circuitry 1008 may also include a transmit signal path, which may include circuitry configured to amplify signals for transmission provided by the RF circuitry 1006 for transmission by one or more of antenna elements of antenna array 1011. In various embodiments, the amplification through the transmit or receive signal paths may be done solely in the RF circuitry 1006, solely in the FEM circuitry 1008, or in both the RF circuitry 1006 and the FEM circuitry 1008.

In some embodiments, the FEM circuitry 1008 may include a TX/RX switch to switch between transmit mode and receive mode operation. The FEM circuitry 1008 may include a receive signal path and a transmit signal path. The receive signal path of the FEM circuitry 1008 may include an LNA to amplify received RF signals and provide the amplified received RF signals as an output (e.g., to the RF circuitry 1006). The transmit signal path of the FEM circuitry 1008 may include a power amplifier (PA) to amplify input RF signals (e.g., provided by RF circuitry 1006), and one or more filters to generate RF signals for subsequent transmission by one or more antenna elements of the antenna array 1011.

The antenna array 1011 comprises one or more antenna elements, each of which is configured convert electrical signals into radio waves to travel through the air and to convert received radio waves into electrical signals. For example, digital baseband signals provided by the baseband circuitry 1010 is converted into analog RF signals (e.g., modulated waveform) that will be amplified and transmitted via the antenna elements of the antenna array 1011 including one or more antenna elements (not shown). The antenna elements may be omnidirectional, direction, or a combination thereof. The antenna elements may be formed in a multitude of arranges as are known and/or discussed herein. The antenna array 1011 may comprise microstrip antennas or printed antennas that are fabricated on the surface of one or more printed circuit boards. The antenna array 1011 may be formed in as a patch of metal foil (e.g., a patch antenna) in a variety of shapes, and may be coupled with the RF circuitry 1006 and/or FEM circuitry 1008 using metal transmission lines or the like.

Processors of the application circuitry 9105/9205 and processors of the baseband circuitry 1010 may be used to execute elements of one or more instances of a protocol stack. For example, processors of the baseband circuitry 1010, alone or in combination, may be used execute Layer 3, Layer 2, or Layer 1 functionality, while processors of the application circuitry 9105/9205 may utilize data (e.g., packet data) received from these layers and further execute Layer 4 functionality (e.g., TCP and UDP layers). As referred to herein, Layer 3 may comprise a RRC layer, described in further detail below. As referred to herein, Layer 2 may comprise a MAC layer, an RLC layer, and a PDCP layer, described in further detail below. As referred to herein, Layer 1 may comprise a PHY layer of a UE/RAN node, described in further detail below.

Figure 11:
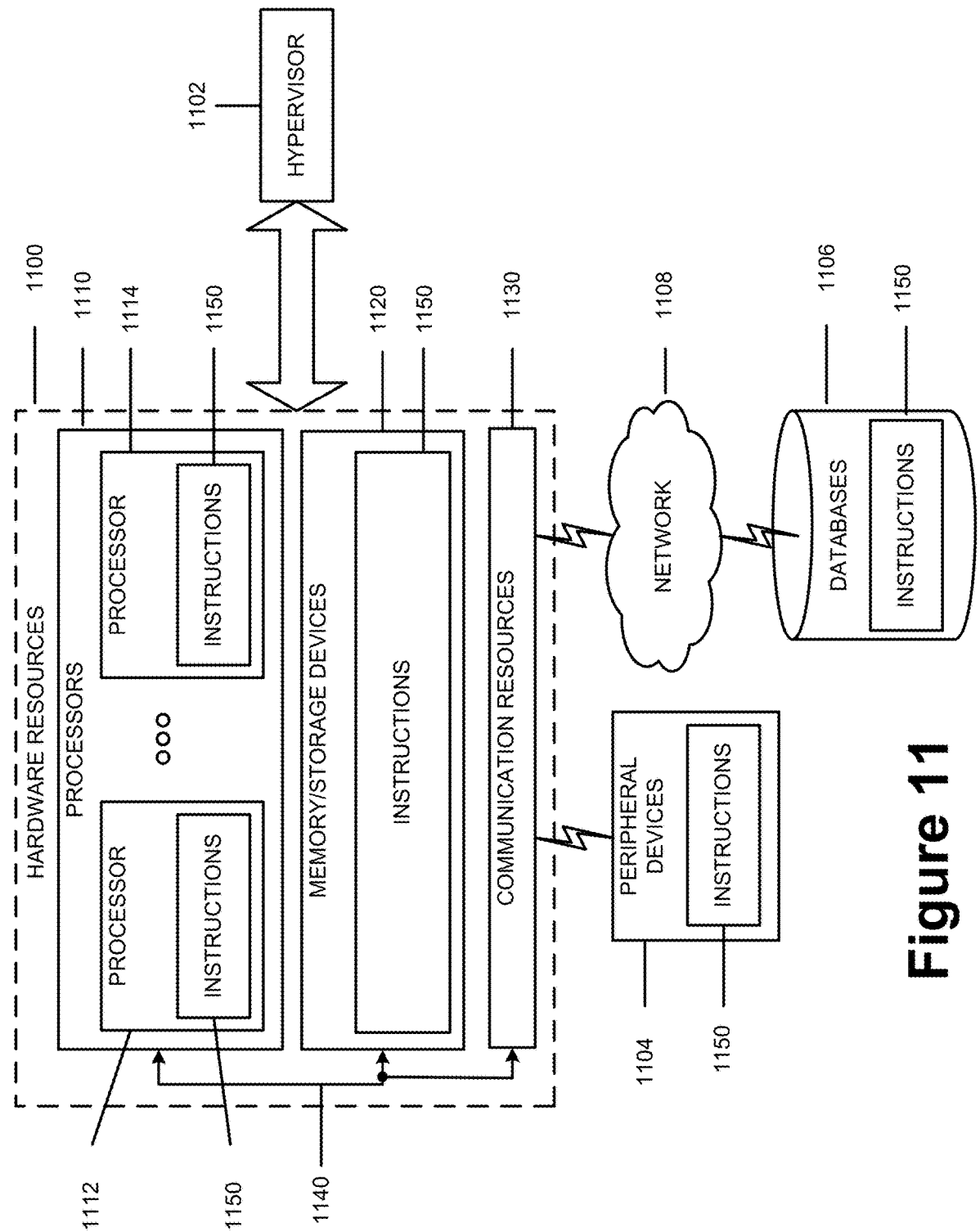
FIG. 11 is a block diagram illustrating components, according to some example embodiments, able to read instructions from a machine-readable or computer-readable medium (e.g., a non-transitory machine-readable storage medium) and perform any one or more of the methodologies discussed herein.

FIG. 11 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 11 shows a diagrammatic representation of hardware resources 1100 including one or more processors (or processor cores) 1110, one or more memory/storage devices 1120, and one or more communication resources 1130, each of which may be communicatively coupled via a bus 1140. For embodiments where node virtualization (e.g., NFV) is utilized, a hypervisor 1102 may be executed to provide an execution environment for one or more network slices/sub-slices to utilize the hardware resources 1100.

The processors 1110 may include, for example, a processor 1112 and a processor 1114. The processor(s) 1110 may be, for example, a central processing unit (CPU), a reduced instruction set computing (RISC) processor, a complex instruction set computing (CISC) processor, a graphics processing unit (GPU), a DSP such as a baseband processor, an ASIC, an FPGA, a radiofrequency integrated circuit (RFIC), another processor (including those discussed herein), or any suitable combination thereof.

The memory/storage devices 1120 may include main memory, disk storage, or any suitable combination thereof. The memory/storage devices 1120 may include, but are not limited to, any type of volatile or nonvolatile memory such as dynamic random access memory (DRAM), static random access memory (SRAM), erasable programmable read-only memory (EPROM), electrically erasable programmable read-only memory (EEPROM), Flash memory, solid-state storage, etc.

The communication resources 1130 may include interconnection or network interface components or other suitable devices to communicate with one or more peripheral devices 1104 or one or more databases 1106 via a network 1108. For example, the communication resources 1130 may include wired communication components (e.g., for coupling via USB), cellular communication components, NFC components, Bluetooth® (or Bluetooth® Low Energy) components, Wi-Fi® components, and other communication components.

Instructions 1150 may comprise software, a program, an application, an applet, an app, or other executable code for causing at least any of the processors 1110 to perform any one or more of the methodologies discussed herein. The instructions 1150 may reside, completely or partially, within at least one of the processors 1110 (e.g., within the processor's cache memory), the memory/storage devices 1120, or any suitable combination thereof. Furthermore, any portion of the instructions 1150 may be transferred to the hardware resources 1100 from any combination of the peripheral devices 1104 or the databases 1106. Accordingly, the memory of processors 1110, the memory/storage devices 1120, the peripheral devices 1104, and the databases 1106 are examples of computer-readable and machine-readable media.

Example Procedures

In some embodiments, the electronic device(s), network(s), system(s), chip(s) or component(s), or portions or implementations thereof, of FIGS. 7-11, or some other figure herein, may be configured to perform one or more processes, techniques, or methods as described herein, or portions thereof. One such process is depicted in FIG. 6C. For example, the process 600 may include, at 605, retrieving reception timing information associated with a plurality of subscriber identity modules (SIMS) for a user equipment (UE) from memory, wherein the reception timing information comprises an indication of unified time intervals and durations during which idle or inactive operations are to be performed for one or more of the plurality of SIMS. The process further includes, at 610, encoding a message that includes the reception timing information for transmission.

Another such process is illustrated in FIG. 6D, which may be performed by a UE in some embodiments. In this example, process 620 includes, at 625, determining reception timing information associated with a plurality of subscriber identity modules (SIMS) for the UE, wherein the reception timing information comprises an indication of unified time intervals and durations during which idle or inactive operations are to be performed for one or more of the plurality of SIMS. Process 620 further includes, at 625, encoding a message that includes the reception timing information for transmission to a network for which the UE is registered.

Another such process is illustrated in FIG. 6E, which may be performed by a UE in some embodiments. In this example, process 640 includes, at 645, determining reception timing information associated with a plurality of subscriber identity modules (SIMS) for the UE, wherein the reception timing information comprises an indication of unified time intervals and durations during which idle or inactive operations are to be performed for one or more of the plurality of SIMS, and wherein the plurality of SIMS include a first SIM associated with a first network and a second SIM associated with a second network. The process further includes, at 650, registering with the first network and the second network. The process further includes, at 655, encoding a first message that includes reception timing information associated with the second SIM for transmission to the first network. The process further includes, at 660, encoding a second message that includes reception timing information associated with the first SIM for transmission to the second network.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLES

Example 5.1a may include when the UE is in connected mode associated with one SIM, it can inform the network of the timings of where the UE needs to perform reception on the other networks for which the UE is registered using another SIM(s) (based on the paging frame, paging offset and paging monitoring occasion etc., for each of the registered networks), so that the involved networks know about the potential collision that can occur in time domain. The UE informs the network about the times where it needs to perform reception on the other SIM(S), either explicitly for each SIM or combine the times and report the unified time intervals and durations during which it expects to perform idle/inactive operations on other SIMS. The UE reports this whenever there is a change in the information.

Example 5.1aa may include the UE and the Network can use the UE assistance information RRC message where the UE informs each of the networks about the DRX information. The network then uses the existing RRC message to convey the new/modified DRX information that tries to avoid the potential collisions.

Example 5.1a-1 may include another option is by using the existing UE assistance information RRC message which can be enhanced and the UE can use this enhanced message to inform each of the networks about its desirable idle/inactive new configuration (e.g. paging DRX configuration) and/or about its problems/collisions when using multi-SIM. The network then may use the existing (or new) RRC message to convey the new/modified idle/inactive configuration (e.g. paging DRX configuration) that tries to avoid the potential collisions for eg., using an offset in the configurations.

Example 5.1a-2 may include a network may coordinate with other NWs the UE is registered with (based on a new set of information that the UEs provides) and provide new/modified idle/inactive configuration for current and potentially even other SIMS.

Example 5.1a-3 may include alternatively, a new RRC message can be created that carries this information from the UE to the network and the network can respond back with a confirmation, where the confirmation can carry the information for the current network that tries to avoid the potential collisions.

Example 5.1a-4 may include the information provided by the UE to the RAN node (gNB or eNB) using the existing or the new RRC message from the above examples 5.1a-1 to 5.1a-3 or some other example herein, wherein, is relayed by the RAN node to the core NW where the timing information is provided to the core NW as well, and any configuration (new or modified) by the core NW to the RAN mode is than given to the UE using the existing UE assistance or the new RRC message.

Example 5.2ac may also propose that the UE can enter into connected mode from idle/inactive to inform the network about the change (or addition) of new UE assistance information regarding the DRX information from other NW/SIMS.

Example 5.1b may include the UE informs the network about the multi-SIM operation in the connected mode and explicitly requests the network to transmit the paging information more than once using multiple DRX cycles (consecutive paging frames with the same paging information), so that the UE can try to get the page in next occasion if there is a collision in the current paging cycle. This also solves the case where more than one network has the same paging cycle and offset.

Example 5.1bb may include the new behavior is defined where a UE can be configured by network (RAN and/or CN) to receive the same paging message in multiple occasion in case collisions of the paging when operating in multi-SIM is foreseen. This may be done by defining a new paging window time or by allowing a UE to monitor additional PF/PO (controlled via new configuration sent by the network or defined based on its current PF/PO).

Example 5.1c may introduce a new paging means by which the UE can be provided with a larger PDSCH information that carries the full information (when possible) that the page intended the UE to receive. This is to avoid the UE to go into connected mode to receive the rest of the message that triggered the page.

Example 5.2.1a may introduce a new HARQ feedback (it can be called RTX—request re-transmission of the last sent redundancy version) from the UE to the NW, which request the NW to not provide a different RV than the one sent in earlier transmission. The UE sends this feedback in case it missed (partially or fully) the earlier transmission due to an autonomous gap.

Example 5.2.1b may introduce a new logic at the network, where if the NW knows that the UE is in multi-SIM operation and if the network does not get any HARQ feedback from the UE for the last transmission, in the re-transmission the network tries to provide the same RV version that was used in the last transmission.

Example 5.2.1c may introduce a new logic at the network, where if the NW knows that the UE is in multi-SIM operation and if the network does not get any UL PUSCH or UL PUSCH multiplexed with UCI, in the re-transmission grant, the network tries to request the same RV version for the UL that was used in the last UL grant. To re-state this in terms of UE specification, in another example that, a new configuration can be provided by the network to the UE such that the UE expects the network to request the same RV version for the UL retransmission that was used in the last UL grant.

Example 5.2.2a may include when the UE is in connected mode with a SIM, the UE requests for a gap in transmission and reception (a gap in time domain) for performing the idle/inactive activities of the other SIMS based on applicable configurations, such as, paging DRX timing (paging frame, paging offset and paging monitoring occasion). The UE may also provide the duration of the gap it needs to perform the activities. This information can be sent using the UE assistance information or another new/existing RRC message (as explained in previous section e.g. examples 5.1a*) or other L2/L1 means (e.g. via MAC CE or DCI). The required gap may also depend on other factors (e.g. category of UE, operation of the given SIM, etc) which can also be known by network via other means (e.g. details defined in specification or known via UE's subscription or network assistance).

Example 5.2.2b may include when the UE is connected mode with a SIM, to handle the cases where the UE needs more than the configured time of the gap in performing activities related to reception associated with the other SIM(s) for eg., for system information reception or for responding to the page, the network needs to be aware of the fact that the UE is still with the other network associated with other SIM and for this reason, in another example that the NW configures the UE with a means by which the UE informs the NW when it is back to the current network after a gap expires.

One method is for the UE to be configured with Rel-15 NR SR-like resource by this network and the UE sets this to inform the network that the UE has finished the activities of other SIMS at the end of a pre-configured measurement gap. If the SR is not set, the network assumes that the UE is performing activities on the other SIM ever after the pre-configured gap has ended.

Another option is for the network to configure the UE with a SRS resource that the UE sounds as soon as the gap expires so that the network know the UE is back in this network. Example 5.2.2b-1 may include this logic is needed primarily on the Primary serving cell (PCell) or the Primary Secondary Serving Cell (PSCell) and that for secondary serving cells (SCells) this is not essential.

Example 5.2.2b-2 may include the network can configure the means for the UE to respond that it has come back from the activities associated with other SIM, after the gap expiry for the secondary serving cells (SCells) as an optional feature that the network can decide and we think this can be used, for eg., to address the cases where the PCell/PSCells are not time synchronized with the SCells.

Example 5.2.2c may include a timer could be set (either defined statically in the specification or configured by the network in a system information or with a dedicated message) and this timer starts when the pre-configured measurement gap ends, and if the UE does not come back to the current SIM before the timer expires (by not setting the SR), the configuration that the UE uses to inform the network using example 5.2.2b*, is not valid.

Example 5.2.2d may include the network can pre-configure the UE with INACTIVE configuration (the content provided to the UE in the RRC release message for inactive configuration) while the UE is in connected mode itself and if the UE spends time on the other SIM that exceeds the guard timer, the UE and the NW assume that the UE is in INACTIVE state Example 5.2.2.d-1a may include in INACTIVE, if the UE supports, the UE will also assume dormancy behavior for the configuration and try to measure based on the dormancy configuration (if configured earlier) on the SIM on which the UE was in connected mode earlier, while performing activities on the other SIM which the UE was performing idle/inactive procedures on. In other words, dormancy can be supported for the suspended active SIM configuration (on all the serving cells that were active) while the UE performs activities on the other SIM. Dormancy behavior starts only after the INACTIVE mode starts.

Example 5.2.2d-1b may include in the INACTIVE state, the UE keeps the entire configuration the UE had before entering the gap, and the UE and NW assume that the UE resumes with this configuration (including SCG configuration) and based on the network response during the resumption the configuration can be changed.

Example 5.2.2da may include the UE keeps the pre-configured INACTIVE configuration which was provided in RRC connected mode, unless NW provides another configuration. The network can update the INACTIVE configuration anytime while the UE is in connected mode, like other RRC configurations.

Example 5.2.2.e may include another procedure where the timer is not needed. As soon as the pre-configured gap has passed and the UE has not set the SR, the NW and the UE consider that the UE shall enter INACTIVE state using the earlier provided configuration and the examples under the sub-section 5.2.2d are valid for this as well.

Example 5.2.2.3a may include the method of examples 5.2.2b to 5.2.2e or some other example herein, wherein we propose that the UE shall only use the time provided in the gap for activities on the other network and if more activities are pending when the gap finishes, the UE comes back to the current network and Using an enhancement to the current UE assistance information, requests the current network to release the current connection (and can optimally provide the time the UE needs to perform the activities on the other network). The UE expresses the desire to go to IDLE or INACTIVE and can provide the reason that it needs to perform activities on the other network.

Alternatively, a new RRC message can be created that the UE uses to request the network to move the UE to IDLE or INACTIVE state.

Irrespective of which message is used, the UE can provide the timing information of the paging occasions it prefers for this network (which the UE uses to monitor this current network, when the UE moves to IDLE or INACTIVE) and the UE bases this information on the information it has about paging activities on the other networks (using examples 5.1a*)

We also example that it's upto the network to decide if the UE is to be moved to IDLE or INACTIVE. The NW can use the additional information the UE provides, as a means to decide which state the UE is to be moved into.

Example 5.3a may include the UE reports it's full capability to each of the networks it registers initially. If the UE enters into connected mode in an other network as well, depending on the configuration of any of the networks with which the UE is in connected mode, the UE uses RRC message to request for a reduced capability of operation. If the configuration of the other network changes such that the UE capability for the current network also changes, the UE uses the same RRC message to report of the changed capability it can handle.

Example 5.3.1a may include one way to implement this is to re-use the UE assistance information RRC message and enhance it with additional parameters that can reflect the changes in UE capability.

Example 5.3.1aa may include using the methods, we also propose that the UE can trigger this message anytime there is a need to inform the change of capability to the relevant network. We also propose that this triggering of UE assistance message would be limited to when the UE is in connected mode.

Example 5.3.1b may include as an alternative implementation, a new RRC message can be created to carry the above 'reduction of capability' message.

Example 5.3.2a may include a different way of solving the capability change that can result from operation of multiSIM with more than one SIM in connected mode is with UE partitioning it's capabilities across all the SIMS it can support simultaneously and reporting this capability for each of the SIMS. This option avoid the dynamic update/reduction of capabilities.

Example 5.3.3a may include as an yet another alternative, the UE can report a set of "delta' configuration to the semi-static capability it reported earlier to the network instead of reporting a reduction from the original capability. The "delta" can reported anytime there is change in configuration on any network the UE is in connected mode with, that resulted in a change in the set of capabilities the UE reports. We can have the delta configuration reported in the UE assistance RRC message or a new RRC message can be used.

Example X01 includes a method comprising:
generating a message that includes reception timing information associated with a plurality of subscriber identity modules (SIMS) for a user equipment (UE); and
encoding the message for transmission.

Example X02 includes the method of example X01 or some other example herein, wherein the reception timing information indicates respective reception timing information for a first SIM associated with the UE and for a second SIM associated with the UE.

Example X03 includes the method of example X01 or some other example herein, wherein the reception timing information includes unified time intervals and durations during which idle or inactive operations are to be performed for one or more SIMS.

Example X04 includes the method of example X01 or some other example herein, wherein the message is encoded for transmission via radio resource control (RRC) signaling.

Example X05 includes the method of example X01 or some other example herein, wherein the message is a UE assistance information message.

Example X06 includes the method of example X01 or some other example herein, further comprising receiving, from a network, configuration information for one or more of the SIMS.

Example X07 includes the method of example X01 or some other example herein, where the message is encoded for transmission to an evolved NodeB (eNB) or a next-generation NodeB (gNB) of a network.

Example X08 includes the method of any one of examples X01-X07, wherein the method is performed by the UE or portion thereof.

Example Y1 includes an apparatus comprising: memory to store reception timing information associated with a plurality of subscriber identity modules (SIMS) for a user equipment (UE); and processor circuitry, coupled with the memory, to: retrieve the reception timing information from the memory, wherein the reception timing information comprises an indication of unified time intervals and durations during which idle or inactive operations are to be performed for one or more of the plurality of SIMS; and encode a message that includes the reception timing information for transmission.

Example Y2 includes the apparatus of example Y1 or some other example herein, wherein the message is encoded for transmission via radio resource control (RRC) signaling.

Example Y3 includes the apparatus of example Y1 or some other example herein, wherein the message is a UE assistance information message.

Example Y4 includes the apparatus of example Y1 or some other example herein, wherein the reception timing information further includes an indication of a reception on a network for which the UE is registered based on: a paging frame associated with the registered network, a paging offset associated with the registered network, or a paging monitoring associated with the registered network.

Example Y5 includes the apparatus of example Y4 or some other example herein, wherein the UE is registered with a first network and a second network, and wherein the reception timing information includes: an indication of a first reception associated with a first SIM for the first network, and an indication of a second reception associated with a second SIM used by the second network.

Example Y6 includes the apparatus of example Y1 or some other example herein, wherein the reception timing information further includes discontinuous reception (DRX) information, the DRX information including an indication of a paging DRX configuration.

Example Y7 includes the apparatus of example Y6 or some other example herein, wherein the DRX information is associated with a first network using a first SIM from the plurality of SIMS, and wherein the message is encoded for transmission to a second network using a second SIM from the plurality of SIMS.

Example Y8 includes one or more non-transitory computer-readable media storing instructions that, when executed by one or more processors, are to cause a user equipment (UE) to: determine reception timing information associated with a plurality of subscriber identity modules (SIMS) for the UE, wherein the reception timing information comprises an indication of unified time intervals and durations during which idle or inactive operations are to be performed for one or more of the plurality of SIMS; and encode a message that includes the reception timing information for transmission to a network for which the UE is registered.

Example Y9 includes the one or more non-transitory computer readable media of example Y8 or some other example herein, wherein the message is encoded for transmission via radio resource control (RRC) signaling.

Example Y10 includes the one or more non-transitory computer readable media of example Y8 or some other example herein, wherein the message is a UE assistance information message.

Example Y11 includes the one or more non-transitory computer readable media of example Y8 or some other example herein, wherein the reception timing information further includes an indication of a reception based on: a paging frame associated with the network, a paging offset associated with the network, or a paging monitoring associated with the network.

Example Y12 includes the one or more non-transitory computer readable media of example Y11 or some other example herein, wherein the network is a first network, wherein the UE is further registered with a second network, and wherein the reception timing information includes an indication of a reception associated with a second SIM used by the second network.

Example Y13 includes the one or more non-transitory computer readable media of example Y8 or some other example herein, wherein the reception timing information further includes discontinuous reception (DRX) information, the DRX information including an indication of a paging DRX configuration.

Example Y14 includes the one or more non-transitory computer readable media of example Y13 or some other example herein, wherein the DRX information is associated with a first network using a first SIM from the plurality of SIMS, and wherein the message is encoded for transmission to a second network using a second SIM from the plurality of SIMS.

Example Y15 includes one or more non-transitory computer-readable media storing instructions that, when executed by one or more processors, are to cause a user equipment (UE) to: determine reception timing information associated with a plurality of subscriber identity modules (SIMS) for the UE, wherein the reception timing information comprises an indication of unified time intervals and durations during which idle or inactive operations are to be performed for one or more of the plurality of SIMS, and wherein the plurality of SIMS include a first SIM associated with a first network and a second SIM associated with a second network; register with the first network and the second network; encode a first message that includes reception timing information associated with the second SIM for transmission to the first network; and encode a second message that includes reception timing information associated with the first SIM for transmission to the second network.

Example Y16 includes the one or more non-transitory computer readable media of example Y15 or some other example herein, wherein the first message or second message is encoded for transmission via radio resource control (RRC) signaling.

Example Y17 includes the one or more non-transitory computer readable media of example Y15 or some other example herein, wherein the first message or second message is a UE assistance information message.

Example Y18 includes the one or more non-transitory computer readable media of example Y15 or some other example herein, wherein the reception timing information associated with the first SIM further includes an indication of a reception based on: a paging frame associated with the first network, a paging offset associated with the first network, or a paging monitoring associated with the first network.

Example Y19 includes the one or more non-transitory computer readable media of example Y15 or some other example herein, wherein the reception timing information associated with the first SIM further includes discontinuous reception (DRX) information associated with the first network, the DRX information including an indication of a paging DRX configuration.

Example Y20 includes the one or more non-transitory computer readable media of example Y15 or some other example herein, wherein the reception timing information associated with the second SIM further includes discontinuous reception (DRX) information associated with the second network, the DRX information including an indication of a paging DRX configuration.

Example Z01 may include an apparatus comprising means to perform one or more elements of a method described in or related to any of the preceding examples, or any other method or process described herein.

Example Z02 may include one or more non-transitory computer-readable media comprising instructions to cause an electronic device, upon execution of the instructions by one or more processors of the electronic device, to perform one or more elements of a method described in or related to any of the preceding examples, or any other method or process described herein.

Example Z03 may include an apparatus comprising logic, modules, or circuitry to perform one or more elements of a method described in or related to any of the preceding examples, or any other method or process described herein.

Example Z04 may include a method, technique, or process as described in or related to any of the preceding examples, or portions or parts thereof.

Example Z05 may include an apparatus comprising: one or more processors and one or more computer-readable media comprising instructions that, when executed by the one or more processors, cause the one or more processors to perform the method, techniques, or process as described in or related to any of the preceding examples, or portions thereof.

Example Z06 may include a signal as described in or related to any of the preceding examples, or portions or parts thereof.

Example Z07 may include a datagram, packet, frame, segment, protocol data unit (PDU), or message as described in or related to any of the preceding examples, or portions or parts thereof, or otherwise described in the present disclosure.

Example Z08 may include a signal encoded with data as described in or related to any of the preceding examples, or portions or parts thereof, or otherwise described in the present disclosure.

Example Z09 may include a signal encoded with a datagram, packet, frame, segment, protocol data unit (PDU), or message as described in or related to any of the preceding examples, or portions or parts thereof, or otherwise described in the present disclosure.

Example Z10 may include an electromagnetic signal carrying computer-readable instructions, wherein execution of the computer-readable instructions by one or more processors is to cause the one or more processors to perform the method, techniques, or process as described in or related to any of the preceding examples, or portions thereof.

Example Z11 may include a computer program comprising instructions, wherein execution of the program by a processing element is to cause the processing element to carry out the method, techniques, or process as described in or related to any of the preceding examples, or portions thereof.

Example Z12 may include a signal in a wireless network as shown and described herein.

Example Z13 may include a method of communicating in a wireless network as shown and described herein.

Example Z14 may include a system for providing wireless communication as shown and described herein.

Example Z15 may include a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Abbreviations

For the purposes of the present document, the following abbreviations may apply to the examples and embodiments discussed herein.

3GPP Third Generation Partnership Project
4G Fourth Generation
5G Fifth Generation
5GC 5G Core network
ACK Acknowledgement
AF Application Function
AM Acknowledged Mode
AMBR Aggregate Maximum Bit Rate
AMF Access and Mobility Management Function
AN Access Network
ANR Automatic Neighbour Relation
AP Application Protocol, Antenna Port, Access Point
API Application Programming Interface
APN Access Point Name
ARP Allocation and Retention Priority
ARQ Automatic Repeat Request
AS Access Stratum
ASN.1 Abstract Syntax Notation One
AUSF Authentication Server Function
AWGN Additive White Gaussian Noise
BAP Backhaul Adaptation Protocol
BCH Broadcast Channel
BER Bit Error Ratio
BFD Beam Failure Detection BLER Block Error Rate
BPSK Binary Phase Shift Keying
BRAS Broadband Remote Access Server
BSS Business Support System
BS Base Station
BSR Buffer Status Report
BW Bandwidth
BWP Bandwidth Part
C-RNTI Cell Radio Network Temporary Identity
CA Carrier Aggregation, Certification Authority
CAPEX CAPital EXpenditure
CBRA Contention Based Random Access
CC Component Carrier, Country Code, Cryptographic Checksum
CCA Clear Channel Assessment
CCE Control Channel Element
CCCH Common Control Channel
CE Coverage Enhancement
CDM Content Delivery Network
CDMA Code-Division Multiple Access
CFRA Contention Free Random Access
CG Cell Group
CI Cell Identity
CID Cell-ID (e.g., positioning method)
CIM Common Information Model
CIR Carrier to Interference Ratio
CK Cipher Key
CM Connection Management, Conditional Mandatory
CMAS Commercial Mobile Alert Service
CMD Command
CMS Cloud Management System
CO Conditional Optional
CoMP Coordinated Multi-Point
CORESET Control Resource Set
COTS Commercial Off-The-Shelf
CP Control Plane, Cyclic Prefix, Connection Point
CPD Connection Point Descriptor
CPE Customer Premise Equipment
CPICH Common Pilot Channel
CQI Channel Quality Indicator
CPU CSI processing unit, Central Processing Unit
C/R Command/Response field bit
CRAN Cloud Radio Access Network, Cloud RAN
CRB Common Resource Block
CRC Cyclic Redundancy Check
CRI Channel-State Information Resource Indicator, CSI-RS Resource Indicator
C-RNTI Cell RNTI
CS Circuit Switched
CSAR Cloud Service Archive
CSI Channel-State Information
CSI-IM CSI Interference Measurement
CSI-RS CSI Reference Signal
CSI-RSRP CSI reference signal received power
CSI-RSRQ CSI reference signal received quality
CSI-SINR CSI signal-to-noise and interference ratio
CSMA Carrier Sense Multiple Access
CSMA/CA CSMA with collision avoidance
CSS Common Search Space, Cell-specific Search Space
CTS Clear-to-Send
CW Codeword
CWS Contention Window Size
D2D Device-to-Device
DC Dual Connectivity, Direct Current
DCI Downlink Control Information
DF Deployment Flavour
DL Downlink
DMTF Distributed Management Task Force
DPDK Data Plane Development Kit
DM-RS, DMRS Demodulation Reference Signal
DN Data network
DRB Data Radio Bearer
DRS Discovery Reference Signal
DRX Discontinuous Reception
DSL Domain Specific Language. Digital Subscriber Line
DSLAM DSL Access Multiplexer
DwPTS Downlink Pilot Time Slot
E-LAN Ethernet Local Area Network
E2E End-to-End
ECCA extended clear channel assessment, extended CCA
ECCE Enhanced Control Channel Element, Enhanced CCE
ED Energy Detection
EDGE Enhanced Datarates for GSM Evolution (GSM Evolution)
EGMF Exposure Governance Management Function
EGPRS Enhanced GPRS
EIR Equipment Identity Register
eLAA enhanced Licensed Assisted Access, enhanced LAA
EM Element Manager
eMBB Enhanced Mobile Broadband
EMS Element Management System
eNB evolved NodeB, E-UTRAN Node B
EN-DC E-UTRA-NR Dual Connectivity
EPC Evolved Packet Core
EPDCCH enhanced PDCCH, enhanced Physical Downlink Control Cannel
EPRE Energy per resource element
EPS Evolved Packet System
EREG enhanced REG, enhanced resource element groups
ETSI European Telecommunications Standards Institute
ETWS Earthquake and Tsunami Warning System
eUICC embedded UICC, embedded Universal Integrated Circuit Card
E-UTRA Evolved UTRA
E-UTRAN Evolved UTRAN
EV2X Enhanced V2X
F1AP F1 Application Protocol
F1-C F1 Control plane interface
F1-U F1 User plane interface
FACCH Fast Associated Control CHannel
FACCH/F Fast Associated Control Channel/Full rate
FACCH/H Fast Associated Control Channel/Half rate
FACH Forward Access Channel
FAUSCH Fast Uplink Signalling Channel
FB Functional Block
FBI Feedback Information
FCC Federal Communications Commission
FCCH Frequency Correction CHannel
FDD Frequency Division Duplex
FDM Frequency Division Multiplex
FDMA Frequency Division Multiple Access
FE Front End
FEC Forward Error Correction
FFS For Further Study
FFT Fast Fourier Transformation
feLAA further enhanced Licensed Assisted Access, further enhanced LAA
FN Frame Number
FPGA Field-Programmable Gate Array
FR Frequency Range
G-RNTI GERAN Radio Network Temporary Identity
GERAN GSM EDGE RAN, GSM EDGE Radio Access Network
GGSN Gateway GPRS Support Node
GLONASS GLObal'naya NAvigatsionnaya Sputnikovaya Sistema (Engl.: Global Navigation Satellite System)
gNB Next Generation NodeB
gNB-CU gNB-centralized unit, Next Generation NodeB centralized unit
gNB-DU gNB-distributed unit, Next Generation NodeB distributed unit
GNSS Global Navigation Satellite System
GPRS General Packet Radio Service
GSM Global System for Mobile Communications, Groupe Spécial Mobile GTP GPRS Tunneling Protocol
GTP-U GPRS Tunnelling Protocol for User Plane
GTS Go To Sleep Signal (related to WUS)
GUMMEI Globally Unique MME Identifier
GUTI Globally Unique Temporary UE Identity
HARQ Hybrid ARQ, Hybrid Automatic Repeat Request
HANDO Handover
HFN HyperFrame Number
HHO Hard Handover
HLR Home Location Register
HN Home Network
HO Handover
HPLMN Home Public Land Mobile Network
HSDPA High Speed Downlink Packet Access
HSN Hopping Sequence Number
HSPA High Speed Packet Access
HSS Home Subscriber Server
HSUPA High Speed Uplink Packet Access
HTTP Hyper Text Transfer Protocol
HTTPS Hyper Text Transfer Protocol Secure
(https is http/1.1 over SSL, i.e. port 443)
I-Block Information Block
ICCID Integrated Circuit Card Identification
IAB Integrated Access and Backhaul
ICIC Inter-Cell Interference Coordination
ID Identity, identifier
IDFT Inverse Discrete Fourier Transform
IE Information element
IBE In-Band Emission
IEEE Institute of Electrical and Electronics
Engineers
IEI Information Element Identifier
IEIDL Information Element Identifier Data Length
IETF Internet Engineering Task Force
IF Infrastructure
IM Interference Measurement, Intermodulation,
IP Multimedia
IMC IMS Credentials
IMEI International Mobile Equipment Identity
IMGI International mobile group identity
IMPI IP Multimedia Private Identity
IMPU IP Multimedia PUblic identity
IMS IP Multimedia Subsystem
IMSI International Mobile Subscriber Identity
IoT Internet of Things
IP Internet Protocol
Ipsec IP Security, Internet Protocol Security
IP-CAN IP-Connectivity Access Network
IP-M IP Multicast
IPv4 Internet Protocol Version 4
IPv6 Internet Protocol Version 6
IR Infrared
IS In Sync
IRP Integration Reference Point
ISDN Integrated Services Digital Network
ISIM IM Services Identity Module
ISO International Organisation for Standardisation
ISP Internet Service Provider
IWF Interworking-Function
I-WLAN Interworking WLAN Constraint length of the
convolutional code, USIM Individual key
kB Kilobyte (1000 bytes)
kbps kilo-bits per second
Kc Ciphering key
Ki Individual subscriber authentication key
KPI Key Performance Indicator
KQI Key Quality Indicator
KSI Key Set Identifier
ksps kilo-symbols per second
KVM Kernel Virtual Machine
L1 Layer 1 (physical layer)
L1-RSRP Layer 1 reference signal received power
L2 Layer 2 (data link layer)
L3 Layer 3 (network layer)
LAA Licensed Assisted Access
LAN Local Area Network
LBT Listen Before Talk
LCM LifeCycle Management
LCR Low Chip Rate
LCS Location Services
LCID Logical Channel ID
LI Layer Indicator
LLC Logical Link Control, Low Layer Compatibility
LPLMN Local PLMN
LPP LTE Positioning Protocol
LSB Least Significant Bit
LTE Long Term Evolution
LWA LTE-WLAN aggregation
LWIP LTE/WLAN Radio Level Integration with IPsec
Tunnel
LTE Long Term Evolution
M2M Machine-to-Machine
MAC Medium Access Control (protocol layering context)
MAC Message authentication code (security/encryption
context)
MAC-A MAC used for authentication and key agreement
(TSG T WG3 context)
MAC-I MAC used for data integrity of signalling messages
(TSG T WG3 context)
MANO Management and Orchestration
MBMS Multimedia Broadcast and Multicast Service
MBSFN Multimedia Broadcast multicast service Single
Frequency Network
MCC Mobile Country Code
MCG Master Cell Group
MCOT Maximum Channel Occupancy Time
MCS Modulation and coding scheme
MDAF Management Data Analytics Function
MDAS Management Data Analytics Service
MDT Minimization of Drive Tests
ME Mobile Equipment
MeNB master eNB
MER Message Error Ratio
MGL Measurement Gap Length
MGRP Measurement Gap Repetition Period
MIB Master Information Block, Management Information
Base
MIMO Multiple Input Multiple Output
MLC Mobile Location Centre
MM Mobility Management
MME Mobility Management Entity
MN Master Node
MO Measurement Object, Mobile Originated
MPBCH MTC Physical Broadcast CHannel
MPDCCH MTC Physical Downlink Control CHannel
MPDSCH MTC Physical Downlink Shared CHannel
MPRACH MTC Physical Random Access CHannel
MPUSCH MTC Physical Uplink Shared Channel
MPLS MultiProtocol Label Switching
MS Mobile Station
MSB Most Significant Bit
MSC Mobile Switching Centre
MSI Minimum System Information, MCH Scheduling
Information
MSID Mobile Station Identifier
MSIN Mobile Station Identification Number
MSISDN Mobile Subscriber ISDN Number
MT Mobile Terminated, Mobile Termination
MTC Machine-Type Communications
mMTC massive MTC, massive Machine-Type Communications
MU-MIMO Multi User MIMO
MWUS MTC wake-up signal, MTC WUS
NACK Negative Acknowledgement
NAI Network Access Identifier
NAS Non-Access Stratum, Non-Access Stratum layer
NCT Network Connectivity Topology
NC-JT Non-Coherent Joint Transmission
NEC Network Capability Exposure
NE-DC NR-E-UTRA Dual Connectivity
NEF Network Exposure Function
NF Network Function
NFP Network Forwarding Path
NFPD Network Forwarding Path Descriptor
NFV Network Functions Virtualization
NFVI NFV Infrastructure
NFVO NFV Orchestrator
NG Next Generation, Next Gen
NGEN-DC NG-RAN E-UTRA-NR Dual Connectivity NM Network Manager
NMS Network Management System
N-PoP Network Point of Presence
NMIB, N-MIB Narrowband MIB
NPBCH Narrowband Physical Broadcast CHannel
NPDCCH Narrowband Physical Downlink Control CHannel
NPDSCH Narrowband Physical Downlink Shared CHannel
NPRACH Narrowband Physical Random Access CHannel
NPUSCH Narrowband Physical Uplink Shared CHannel
NPSS Narrowband Primary Synchronization Signal
NSSS Narrowband Secondary Synchronization Signal
NR New Radio, Neighbour Relation
NRF NF Repository Function
NRS Narrowband Reference Signal
NS Network Service
NSA Non-Standalone operation mode
NSD Network Service Descriptor
NSR Network Service Record
NSSAI Network Slice Selection Assistance Information
S-NNSAI Single-NSSAI
NSSF Network Slice Selection Function
NW Network
NWUS Narrowband wake-up signal, Narrowband WUS
NZP Non-Zero Power
O&M Operation and Maintenance
ODU2 Optical channel Data Unit - type 2
OFDM Orthogonal Frequency Division Multiplexing
OFDMA Orthogonal Frequency Division Multiple Access
OOB Out-of-band
OOS Out of Sync
OPEX OPerating EXpense
OSI Other System Information
OSS Operations Support System
OTA over-the-air
PAPR Peak-to-Average Power Ratio
PAR Peak to Average Ratio
PBCH Physical Broadcast Channel
PC Power Control, Personal Computer
PCC Primary Component Carrier, Primary CC
PCell Primary Cell
PCI Physical Cell ID, Physical Cell Identity
PCEF Policy and Charging Enforcement Function
PCF Policy Control Function
PCRF Policy Control and Charging Rules Function
PDCP Packet Data Convergence Protocol, Packet Data Convergence Protocol layer
PDCCH Physical Downlink Control Channel
PDCP Packet Data Convergence Protocol
PDN Packet Data Network, Public Data Network
PDSCH Physical Downlink Shared Channel
PDU Protocol Data Unit
PEI Permanent Equipment Identifiers
PFD Packet Flow Description
P-GW PDN Gateway
PHICH Physical hybrid-ARQ indicator channel
PHY Physical layer
PLMN Public Land Mobile Network
PIN Personal Identification Number
PM Performance Measurement
PMI Precoding Matrix Indicator
PNF Physical Network Function
PNFD Physical Network Function Descriptor
PNFR Physical Network Function Record
POC PTT over Cellular
PP, PTP Point-to-Point
PPP Point-to-Point Protocol
PRACH Physical RACH
PRB Physical resource block
PRG Physical resource block group
ProSe Proximity Services, Proximity-Based Service
PRS Positioning Reference Signal
PRR Packet Reception Radio
PS Packet Services
PSBCH Physical Sidelink Broadcast Channel
PSDCH Physical Sidelink Downlink Channel
PSCCH Physical Sidelink Control Channel
PSSCH Physical Sidelink Shared Channel
PSCell Primary SCell
PSS Primary Synchronization Signal
PSTN Public Switched Telephone Network
PT-RS Phase-tracking reference signal
PTT Push-to-Talk
PUCCH Physical Uplink Control Channel
PUSCH Physical Uplink Shared Channel
QAM Quadrature Amplitude Modulation
QCI QoS class of identifier
QCL Quasi co-location
QFI QoS Flow ID, QoS Flow Identifier
QoS Quality of Service
QPSK Quadrature (Quaternary) Phase Shift Keying
QZSS Quasi-Zenith Satellite System
RA-RNTI Random Access RNTI
RAB Radio Access Bearer, Random Access Burst
RACH Random Access Channel
RADIUS Remote Authentication Dial In User Service
RAN Radio Access Network
RAND RANDom number (used for authentication)
RAR Random Access Response
RAT Radio Access Technology
RAU Routing Area Update
RB Resource block, Radio Bearer
RBG Resource block group
REG Resource Element Group
Rel Release
REQ REQuest
RF Radio Frequency
RI Rank Indicator
RIV Resource indicator value
RL Radio Link
RLC Radio Link Control, Radio Link Control layer
RLC AM RLC Acknowledged Mode
RLC UM RLC Unacknowledged Mode
RLF Radio Link Failure
RLM Radio Link Monitoring
RLM-RS Reference Signal for RLM
RM Registration Management
RMC Reference Measurement Channel
RMSI Remaining MSI, Remaining Minimum System Information
RN Relay Node
RNC Radio Network Controller
RNL Radio Network Layer
RNTI Radio Network Temporary Identifier
ROHC RObust Header Compression
RRC Radio Resource Control, Radio Resource Control layer
RRM Radio Resource Management
RS Reference Signal
RSRP Reference Signal Received Power
RSRQ Reference Signal Received Quality
RSSI Received Signal Strength Indicator
RSU Road Side Unit
RSTD Reference Signal Time difference
RTP Real Time Protocol
RTS Ready-To-Send
RTT Round Trip Time
Rx Reception, Receiving, Receiver
S1AP S1 Application Protocol
S1-MME S1 for the control plane
S1-U S1 for the user plane
S-GW Serving Gateway
S-RNTI SRNC Radio Network Temporary Identity
S-TMSI SAE Temporary Mobile Station Identifier
SA Standalone operation mode
SAE System Architecture Evolution
SAP Service Access Point
SAPD Service Access Point Descriptor
SAPI Service Access Point Identifier
SCC Secondary Component Carrier, Secondary CC
SCell Secondary Cell
SC-FDMA Single Carrier Frequency Division Multiple Access
SCG Secondary Cell Group
SCM Security Context Management
SCS Subcarrier Spacing
SCTP Stream Control Transmission Protocol
SDAP Service Data Adaptation Protocol, Service Data Adaptation Protocol layer SDL Supplementary Downlink
SDNF Structured Data Storage Network Function
SDP Session Description Protocol
SDSF Structured Data Storage Function
SDU Service Data Unit
SEAF Security Anchor Function
SeNB secondary eNB
SEPP Security Edge Protection Proxy
SFI Slot format indication
SFTD Space-Frequency Time Diversity, SFN and frame timing difference
SFN System Frame Number
SgNB Secondary gNB
SGSN Serving GPRS Support Node
S-GW Serving Gateway
SI System Information
SI-RNTI System Information RNTI
SIB System Information Block
SIM Subscriber Identity Module
SIP Session Initiated Protocol
SiP System in Package
SL Sidelink
SLA Service Level Agreement
SM Session Management
SMF Session Management Function
SMS Short Message Service
SMSF SMS Function
SMTC SSB-based Measurement Timing Configuration
SN Secondary Node, Sequence Number
SoC System on Chip
SON Self-Organizing Network
SpCell Special Cell
SP-CSI-RNTI Semi-Persistent CSI RNTI
SPS Semi-Persistent Scheduling
SQN Sequence number
SR Scheduling Request
SRB Signalling Radio Bearer
SRS Sounding Reference Signal
SS Synchronization Signal
SSB Synchronization Signal Block, SS/PBCH Block
SSBRI SS/PBCH Block Resource Indicator, Synchronization Signal Block Resource Indicator
SSC Session and Service Continuity
SS-RSRP Synchronization Signal based Reference Signal Received Power
SS-RSRQ Synchronization Signal based Reference Signal Received Quality
SS-SINR Synchronization Signal based Signal to Noise and Interference Ratio
SSS Secondary Synchronization Signal
SSSG Search Space Set Group
SSSIF Search Space Set Indicator
SST Slice/Service Types
SU-MIMO Single User MIMO
SUL Supplementary Uplink
TA Timing Advance, Tracking Area
TAC Tracking Area Code
TAG Timing Advance Group
TAU Tracking Area Update
TB Transport Block
TBS Transport Block Size
TBD To Be Defined
TCI Transmission Configuration Indicator
TCP Transmission Communication Protocol
TDD Time Division Duplex
TDM Time Division Multiplexing
TDMA Time Division Multiple Access
TE Terminal Equipment
TEID Tunnel End Point Identifier
TFT Traffic Flow Template
TMSI Temporary Mobile Subscriber Identity
TNL Transport Network Layer
TPC Transmit Power Control
TPMI Transmitted Precoding Matrix Indicator
TR Technical Report
TRP, TRxP Transmission Reception Point
TRS Tracking Reference Signal
TRx Transceiver
TS Technical Specifications, Technical Standard
TTI Transmission Time Interval
Tx Transmission, Transmitting, Transmitter
U-RNTI UTRAN Radio Network Temporary Identity
UART Universal Asynchronous Receiver and Transmitter
UCI Uplink Control Information
UE User Equipment
UDM Unified Data Management
UDP User Datagram Protocol
UDSF Unstructured Data Storage Network Function
UICC Universal Integrated Circuit Card
UL Uplink
UM Unacknowledged Mode
UML Unified Modelling Language
UMTS Universal Mobile Telecommunications System
UP User Plane
UPF User Plane Function
URI Uniform Resource Identifier
URL Uniform Resource Locator
URLLC Ultra- Reliable and Low Latency
USB Universal Serial Bus
USIM Universal Subscriber Identity Module
USS UE-specific search space
UTRA UMTS Terrestrial Radio Access
UTRAN Universal Terrestrial Radio Access Network
UwPTS Uplink Pilot Time Slot
V2I Vehicle-to-Infrastructure
V2P Vehicle-to-Pedestrian
V2V Vehicle-to-Vehicle
V2X Vehicle-to-everything
VIM Virtualized Infrastructure Manager
VL Virtual Link,
VLAN Virtual LAN, Virtual Local Area Network
VM Virtual Machine
VNF Virtualized Network Function
VNFFG VNF Forwarding Graph
VNFFGD VNF Forwarding Graph Descriptor
VNFM VNF Manager
VoIP Voice-over-IP, Voice-over-Internet Protocol
VPLMN Visited Public Land Mobile Network
VPN Virtual Private Network
VRB Virtual Resource Block
WiMAX Worldwide Interoperability for Microwave Access
WLAN Wireless Local Area Network
WMAN Wireless Metropolitan Area Network
WPAN Wireless Personal Area Network
X2-C X2-Control plane
X2-U X2-User plane
XML eXtensible Markup Language
8ES EXpected user RESponse
XOR eXclusive OR
ZC Zadoff-Chu
ZP Zero Power Terminology For the purposes of the present document, the following terms and definitions are applicable to the examples and embodiments discussed herein.

The term "circuitry" as used herein refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable SoC), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, and/or transferring digital data. The term "processor circuitry" may refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, software modules, and/or functional processes. The terms "application circuitry" and/or "baseband circuitry" may be considered synonymous to, and may be referred to as, "processor circuitry."

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, and/or the like.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "network element" as used herein refers to physical or virtualized equipment and/or infrastructure used to provide wired or wireless communication network services. The term "network element" may be considered synonymous to and/or referred to as a networked computer, networking hardware, network equipment, network node, router, switch, hub, bridge, radio network controller, RAN device, RAN node, gateway, server, virtualized VNF, NFVI, and/or the like.

The term "computer system" as used herein refers to any type interconnected electronic devices, computer devices, or components thereof. Additionally, the term "computer system" and/or "system" may refer to various components of a computer that are communicatively coupled with one another. Furthermore, the term "computer system" and/or "system" may refer to multiple computer devices and/or multiple computing systems that are communicatively coupled with one another and configured to share computing and/or networking resources.

The term "appliance," "computer appliance," or the like, as used herein refers to a computer device or computer system with program code (e.g., software or firmware) that is specifically designed to provide a specific computing resource. A "virtual appliance" is a virtual machine image to be implemented by a hypervisor-equipped device that virtualizes or emulates a computer appliance or otherwise is dedicated to provide a specific computing resource.

The term "resource" as used herein refers to a physical or virtual device, a physical or virtual component within a computing environment, and/or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, and/or the like. A "hardware resource" may refer to compute, storage, and/or network resources provided by physical hardware element(s). A "virtualized resource" may refer to compute, storage, and/or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing and/or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" as used herein refers to a connection between two devices through a RAT for the purpose of transmitting and receiving information.

The terms "instantiate," "instantiation," and the like as used herein refers to the creation of an instance. An "instance" also refers to a concrete occurrence of an object, which may occur, for example, during execution of program code.

The terms "coupled," "communicatively coupled," along with derivatives thereof are used herein. The term "coupled" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or ink, and/or the like.

The term "information element" refers to a structural element containing one or more fields. The term "field" refers to individual contents of an information element, or a data element that contains content.

The term "SMTC" refers to an SSB-based measurement timing configuration configured by SSB-MeasurementTimingConfiguration.

The term "SSB" refers to an SS/PBCH block.

The term "a "Primary Cell" refers to the MCG cell, operating on the primary frequency, in which the UE either performs the initial connection establishment procedure or initiates the connection re-establishment procedure.

The term "Primary SCG Cell" refers to the SCG cell in which the UE performs random access when performing the Reconfiguration with Sync procedure for DC operation.

The term "Secondary Cell" refers to a cell providing additional radio resources on top of a Special Cell for a UE configured with CA.

The term "Secondary Cell Group" refers to the subset of serving cells comprising the PSCell and zero or more secondary cells for a UE configured with DC.

The term "Serving Cell" refers to the primary cell for a UE in RRC_CONNECTED not configured with CA/DC there is only one serving cell comprising of the primary cell.

The term "serving cell" or "serving cells" refers to the set of cells comprising the Special Cell(s) and all secondary cells for a UE in RRC_CONNECTED configured with CA/.

The term "Special Cell" refers to the PCell of the MCG or the PSCell of the SCG for DC operation; otherwise, the term "Special Cell" refers to the Pcell.

What is claimed is:

1. An apparatus comprising:
   memory to store reception timing information associated with a plurality of subscriber identity modules (SIMs) for a user equipment (UE); and
   processor circuitry, coupled with the memory, to:
      retrieve the reception timing information from the memory, wherein the reception timing information comprises an indication of unified time intervals and durations during which idle or inactive operations are to be performed for one or more of the plurality of SIMs, and wherein the reception timing information further includes an indication of a reception on a network for which the UE is registered based on: a paging frame associated with the registered network, a paging offset associated with the registered network, or a paging monitoring occasion associated with the registered network; and
      encode a message that includes the reception timing information for transmission.

2. The apparatus of claim 1, wherein the message is encoded for transmission via radio resource control (RRC) signaling.

3. The apparatus of claim 1, wherein the message is a UE assistance information message.

4. The apparatus of claim 1, wherein the UE is registered with a first network and a second network, and wherein the reception timing information includes: an indication of a first reception associated with a first SIM for the first network, and an indication of a second reception associated with a second SIM used by the second network.

5. The apparatus of claim 1, wherein the reception timing information further includes discontinuous reception (DRX) information, the DRX information including an indication of a paging DRX configuration.

6. The apparatus of claim 5, wherein the DRX information is associated with a first network using a first SIM from the plurality of SIMs, and wherein the message is encoded for transmission to a second network using a second SIM from the plurality of SIMs.

7. One or more non-transitory computer-readable media storing instructions that, when executed by one or more processors, are to cause a user equipment (UE) to:
   determine reception timing information associated with a plurality of subscriber identity modules (SIMs) for the UE, wherein the reception timing information comprises an indication of unified time intervals and durations during which idle or inactive operations are to be performed for one or more of the plurality of SIMs, and wherein the reception timing information further includes discontinuous reception (DRX) information, wherein the DRX information includes an indication of a paging DRX configuration, and wherein the DRX information is associated with a first network using a first SIM from the plurality of SIMs; and
   encode a message that includes the reception timing information for transmission to a network for which the UE is registered, wherein the message is encoded for transmission to a second network using a second SIM from the plurality of SIMs.

8. The one or more non-transitory computer-readable media of claim 7, wherein the message is encoded for transmission via radio resource control (RRC) signaling.

9. The one or more non-transitory computer-readable media of claim 7, wherein the message is a UE assistance information message.

10. The one or more non-transitory computer-readable media of claim 7, wherein the reception timing information further includes an indication of a reception based on: a paging frame associated with the network, a paging offset associated with the network, or a paging monitoring occasion associated with the network.

11. The one or more non-transitory computer-readable media of claim 10, wherein the network is a first network, wherein the UE is further registered with a second network, and wherein the reception timing information includes an indication of a reception associated with a second SIM used by the second network.

12. One or more non-transitory computer-readable media storing instructions that, when executed by one or more processors, are to cause a user equipment (UE) to:
   determine reception timing information associated with a plurality of subscriber identity modules (SIMs) for the UE, wherein the reception timing information comprises an indication of unified time intervals and durations during which idle or inactive operations are to be performed for one or more of the plurality of SIMs, and wherein the plurality of SIMs include a first SIM associated with a first network and a second SIM associated with a second network;
   register with the first network and the second network;
   encode a first message that includes reception timing information associated with the second SIM for transmission to the first network; and
   encode a second message that includes reception timing information associated with the first SIM for transmission to the second network.

13. The one or more non-transitory computer-readable media of claim 12, wherein the first message or second message is encoded for transmission via radio resource control (RRC) signaling.

14. The one or more non-transitory computer-readable media of claim 12, wherein the first message or second message is a UE assistance information message.

15. The one or more non-transitory computer-readable media of claim 12, wherein the reception timing information associated with the first SIM further includes an indication of a reception based on: a paging frame associated with the first network, a paging offset associated with the first network, or a paging monitoring associated with the first network.

16. The one or more non-transitory computer-readable media of claim 12, wherein the reception timing information associated with the first SIM further includes discontinuous reception (DRX) information associated with the first network, the DRX information including an indication of a paging DRX configuration.

17. The one or more non-transitory computer-readable media of claim 12, wherein the reception timing information associated with the second SIM further includes discontinuous reception (DRX) information associated with the second network, the DRX information including an indication of a paging DRX configuration.

\* \* \* \* \*